(12) United States Patent
Tokita

(10) Patent No.: US 11,831,822 B2
(45) Date of Patent: Nov. 28, 2023

(54) INFORMATION PROCESSING APPARATUS AND CONTROL METHOD THEREOF SETTING A RULE FOR PROPERTY INFORMATION BASED ON A DRAG AND DROP OPERATION

(71) Applicant: CANON KABUSHIKI KAISHA, Tokyo (JP)

(72) Inventor: Ken Tokita, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/931,639

(22) Filed: Sep. 13, 2022

(65) Prior Publication Data

US 2023/0007132 A1 Jan. 5, 2023

Related U.S. Application Data

(63) Continuation of application No. 17/209,842, filed on Mar. 23, 2021, now Pat. No. 11,477,332.

(30) Foreign Application Priority Data

Mar. 30, 2020 (JP) .................................. 2020-061446
Oct. 13, 2020 (JP) .................................. 2020-172746

(51) Int. Cl.
*H04N 1/00* (2006.01)

(52) U.S. Cl.
CPC ....... *H04N 1/00244* (2013.01); *H04N 1/0097* (2013.01); *H04N 1/00411* (2013.01)

(58) Field of Classification Search
None
See application file for complete search history.

(56) References Cited

U.S. PATENT DOCUMENTS

| | | | |
|---|---|---|---|
| 8,468,213 B2 | 6/2013 | Kamata | |
| 9,916,316 B2 | 3/2018 | Tokita | |
| 2008/0155439 A1* | 6/2008 | Stern | G06F 3/0486 715/769 |
| 2011/0019242 A1 | 1/2011 | Tajima | |
| 2011/0090534 A1 | 4/2011 | Terao | |
| 2011/0221782 A1 | 9/2011 | Ito | |
| 2011/0231798 A1 | 9/2011 | Cok | |
| 2014/0172931 A1 | 6/2014 | Tokita | |

(Continued)

FOREIGN PATENT DOCUMENTS

JP 2019-169951 A 10/2019

*Primary Examiner* — Henok Shiferaw
(74) *Attorney, Agent, or Firm* — VENABLE LLP

(57) ABSTRACT

To enable a user to more easily set a rule relating to folder allocation and file naming at the time of filing data, such as a document scanned image and a received facsimile, and storing the file. On a user interface screen for setting a rule relating to property information that is used at the time of allocating a file to a folder for storage, at least a first area for editing the rule and a second area displaying an item a user can select are provided. The item is a unit element for a user to set a character string configuring the property information and corresponds to a character string of an arbitrary attribute a user can set. Then, the rule is created by the item selected by a user from the second area being arranged at a position designated by the user in the first area.

29 Claims, 28 Drawing Sheets

(56) References Cited

U.S. PATENT DOCUMENTS

| | | | |
|---|---|---|---|
| 2016/0004713 A1* | 1/2016 | Miyamoto | G06F 16/168 |
| | | | 707/829 |
| 2016/0065782 A1 | 3/2016 | Mori | |
| 2016/0277607 A1 | 9/2016 | Tanaka | |
| 2016/0316091 A1 | 10/2016 | Mori | |
| 2016/0316093 A1 | 10/2016 | Tamura | |
| 2017/0099403 A1 | 4/2017 | Honda | |
| 2018/0218208 A1 | 8/2018 | Arakawa | |
| 2019/0079785 A1 | 3/2019 | Hori | |
| 2020/0230856 A1 | 7/2020 | Enomoto | |
| 2020/0336611 A1* | 10/2020 | Soga | H04N 1/00411 |
| 2021/0165918 A1 | 6/2021 | Bowen | |
| 2021/0227082 A1 | 7/2021 | Mori | |
| 2022/0182504 A1* | 6/2022 | Miyamoto | H04N 1/00848 |
| 2022/0201146 A1* | 6/2022 | Ito | G06V 30/19067 |
| 2022/0417370 A1* | 12/2022 | Mori | G06V 10/945 |

\* cited by examiner

Addition of Scan Profile

Name: Filing assist for scan center - scan and transmit to Google drive
Input the display name that is used in this scan profile.

Setting of Workflow

OCR language for input: Select one or more languages. You can add up to five languages.

Path of folder: You can designate a default folder to store or browse. Check Help for details of the input method.

Rule of storage destination folder: Setting of rule of storage destination folder ~2201
Define the rule to create the storage destination folder of the scanned file.

Document division method: Designate by number of pages
Divide document in designated number of pages. For example, in a case where "2" is designated, the document is divided in two pages.

Number of pages:

Skip blank page of document: This is applied only to the scan from the feeder. Check that the device is compatible with this setting.

Automatically start scan: This is applied only to the scan from the feeder.

Automatically perform processing after scan: This is applied only to the scan from the feeder. Check that the device is compatible with this setting.

Add  Cancel

- Add
- Delete

Company name

2400

← Back to list

Display name — 2401
Company name

Default value — 2402
This field will be set to this value by default. It can be a fixed value or a run-time variable.

Data extraction rule — 2403
Input the regular expression of the character string from the value extracted from the document or the manually input value.

Data verification rule — 2404
Input the regular expression to verify the character string that is input in the field.

Store

FIG.27

INFORMATION PROCESSING APPARATUS AND CONTROL METHOD THEREOF SETTING A RULE FOR PROPERTY INFORMATION BASED ON A DRAG AND DROP OPERATION

This application is a continuation of U.S. application Ser. No. 17/209,842, filed Mar. 23, 2021, the contents of which is incorporated by reference herein.

BACKGROUND OF THE INVENTION

Field of the Invention

The technique of the present disclosure relates to a technique to set a rule at the time of allocating a file to a folder.

Description of the Related Art

Conventionally, in an information processing apparatus, such as an MFP (Multifunctional Peripheral), a method is made use of widely, which files (computerizes) image data obtained by scanning a document or received facsimile data and transmits the file to a storage server on a network and stores the file therein. Then, at the time of storing the filed data, automatic allocation of the file to a folder is also performed. For example, Japanese Patent Laid-Open No. 2019-169951 has disclosed a technique to automatically perform creation of a folder and allocation of facsimile data to the folder in accordance with a folder naming rule that is set in advance. It is assumed that as the folder naming rule in the technique of Japanese Patent Laid-Open No. 2019-169951 (in the following, called "prior art"), the attribute name "registered name" is set to the folder name of the first hierarchical layer, the attribute name "Fax number" is set to the folder name of the second hierarchical layer, and the attribute name "reception date" is set to the folder name of the third hierarchical layer, respectively. In this case, on a condition that a new facsimile is received, a new folder is created by allocating information (registered name, Fax number, reception date) specified from the received facsimile data to the corresponding attribute names as each attribute value. The, in the created folder, the file of the received facsimile data is stored.

In the case of the above-described prior art, the input fields (first hierarchical layer to third hierarchical layer) of the attribute name are determined in advance for each hierarchical layer. For example, it is assumed that a user inputs an attribute value "A" in the input field for the folder in the first hierarchical layer and inputs an attribute value "B" in the input field for the folder in the second hierarchical layer. Further, it is assumed that a user desires to create a folder newly using an attribute value "C" between the first hierarchical layer and the second hierarchical layer. In the case such as this, with the above-described prior art, it is necessary to change all the input fields for the folders in the second and subsequent hierarchical layers. Specifically, it is necessary to change the input contents from the attribute value "B" to "C" in the input filed for the new folder in the second hierarchical layer and further to input the attribute value "B" in the input field for the new folder in the third hierarchical layer (previous second hierarchical layer). That is, in the case of the above-described prior art, the hierarchical layers of the folders and the input fields thereof are fixed, and therefore, in a case where a new folder is inserted between the folder in the Nth hierarchical layer and the folder in the (N+1)th hierarchical layer, complicated work is required.

Further, in the case of the above-described prior art, the configuration is such that a user is caused to select the attribute name from a pulldown menu in each input filed, but it is not possible for a user to create a new attribute name and apply it to the folder allocation rule or the rule relating to file naming.

Consequently, an object of the technique of the present disclosure is to make is possible for a user to more easily set the rule relating to folder allocation and file naming at the time of filing data, such as a document scanned image and a received facsimile, and storing the file.

SUMMARY OF THE INVENTION

The information processing apparatus according to the present disclosure is an information processing apparatus for allocating a file to a folder for storage, and includes: a display control unit configured to control a display of a user interface screen for setting a rule relating to property information that is used at the time of the storage, and the user interface screen having a first area for editing the rule and a second area displaying a unit item a user can select, the unit item is a unit element for a user to set a character string configuring the property information, the unit item includes a particular item corresponding to a character string of an arbitrary attribute a user can set, the rule is created by the unit item selected by a user from the second area being arranged at a position designated by the user in the first area, and in a case where an attribute name of the particular item is input by a user, the display control unit arranges the particular item having the input attribute name at a position designated by a user in the rule which being displayed in the first area and being edited and adds the arranged particular item to the second area.

Further features of the present disclosure will become apparent from the following description of exemplary embodiments with reference to the attached drawings.

BRIEF DESCRIPTION OF THE DRAWINGS

FIG. 14 is a diagram showing an example of a property setting screen;

FIG. 18 is a diagram showing the way an attribute value of a custom token is input on the property setting screen;

FIG. 22 is a diagram showing an example of the scan profile addition screen;

FIG. 24 is a diagram showing an example of a custom token normalization rule setting screen;

FIG. 27 is a diagram showing the way a custom token normalization rule is selected on the property setting screen.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
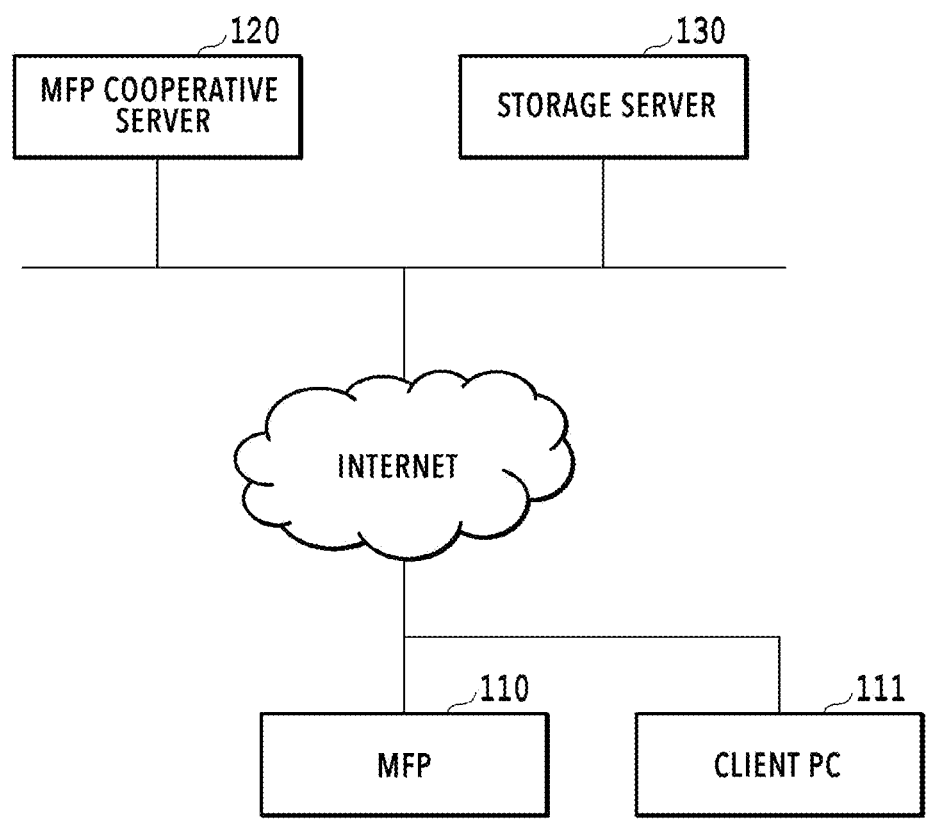
FIG. 1 is a diagram showing an entire configuration of an image processing system.

FIG. 1 is a diagram showing the entire configuration of an information processing system according to the present embodiment. The information processing system includes an MFP (Multifunction Peripheral) 110, a client PC 111, and server apparatuses 120 and 130 that provide cloud services on the internet. The MFP 110 and the client PC 111 are connected so as to be capable of communication with various apparatuses providing various services on the internet via a LAN (Local Area Network).

The MFP 110 is an example of an information processing apparatus having the scan function. The MFP 110 is a multifunction peripheral having a plurality of functions, such as the print function and the BOX store function, in addition to the scan function. The client PC 111 is an information processing apparatus, such as a desktop terminal and a mobile terminal, capable of receiving a cloud service via the internet. Both the server apparatuses 120 and 130 are each an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (hereinafter, called "storage services") to store file data sent via the internet in a predetermined folder, provide a stored file in response to a request from a web browser of the client PC 111, and so on. In the present embodiment, the server apparatus 120 that provides the MFP cooperative service is called "MFP cooperative server" and the server apparatus 130 that provides the storage service is called "storage server".

The information processing system of the present embodiment has the configuration including the MFP 110, the client PC 111, the MFP cooperative server 120, and the storage server 130, but the configuration is not limited to this. For example, the MFP 110 may play the role of the client PC 111 and the MFP cooperative server 120. Further, the MFP cooperative server 120 may be arranged on a LAN instead of the internet. Furthermore, it may also be possible to apply the present embodiment to a scene in which a scanned image of a document is transmitted by being attached to a mail by replacing the storage server 130 with a mail server or the like.

<Hardware Configuration of MFP 110>

Figure 2:
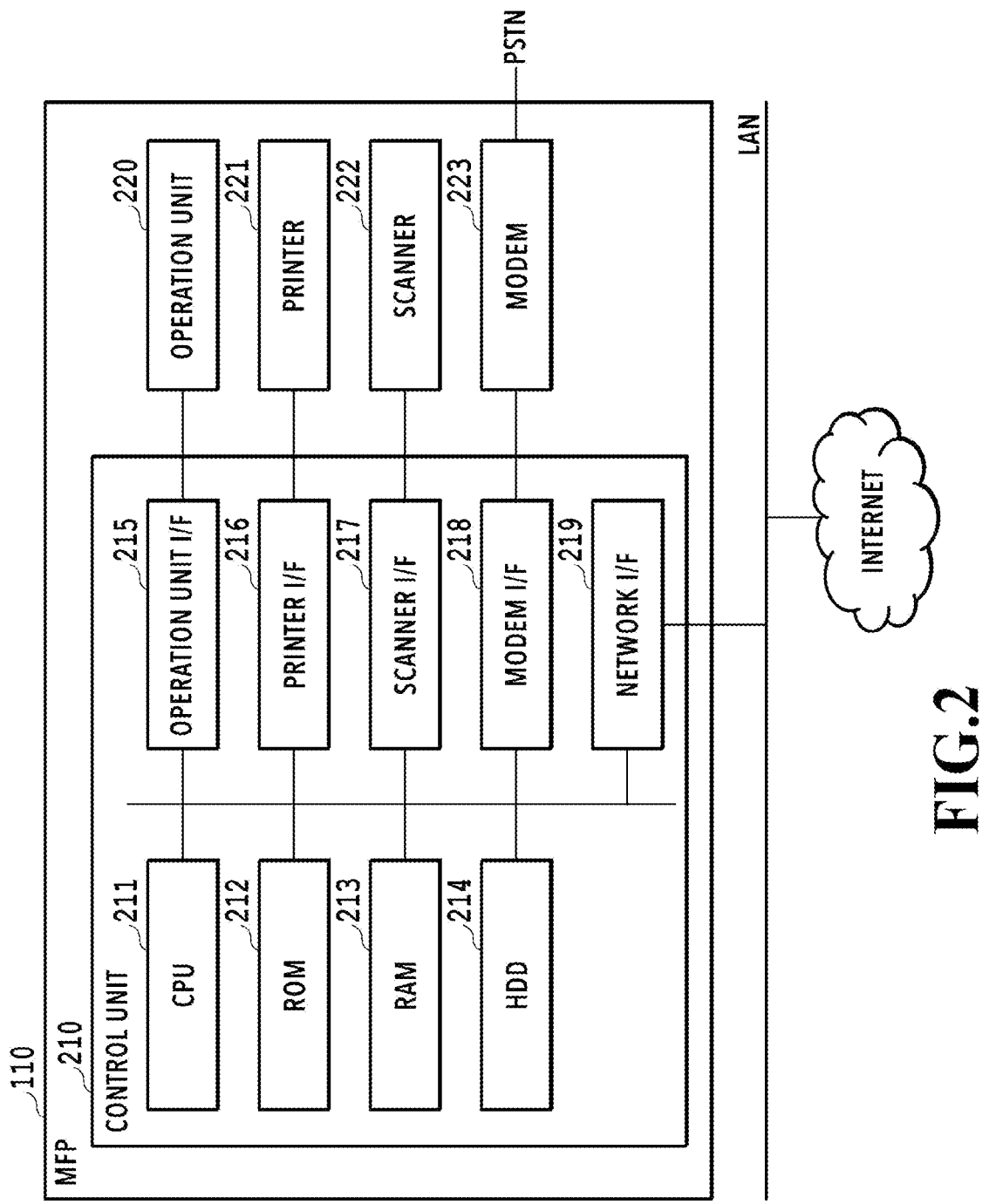
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CUP 211 reads control programs (programs corresponding to various functions shown in a software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in flowcharts, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another.

The HDD 214 is a large-capacity storage unit configured to store image data and various programs. The operation unit I/F 215 is an interface that connects the operation unit 220 and the control unit 210. The operation unit 220 is provided with a touch panel, a keyboard and the like and receives operations/inputs/instructions by a user. The touch operation to the touch panel includes the operation by a human finger and the operation by a touch pen. The printer I/F 216 is an interface that connects the printer unit 221 and the control unit 210. Image data to be printed is transferred from the control unit 210 to the printer unit 221 via the printer I/F 216 and printed on a printing medium.

The scanner I/F 217 is an interface that connects the scanner unit 222 and the control unit 210. The scanner unit 222 generates scanned image data by reading a document that is set on a document table or ADF (Auto Document Feeder), not shown schematically, and inputs the scanned image data to the control unit 210 via the scanner I/F 217. It is possible to print (copy and output) the scanned image data generated by the scanner unit 222 in the printer unit 221, store the data in the HDD 214, transmit the data to an external apparatus, such as the MFP cooperative server 120, as a file or a mail via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits image data and information to each service on the internet, receives various kinds of information, and so on by using the network I/F 219. The hardware configuration of the MFP 110 explained above is an example and the hardware configuration may comprise another configuration as needed or may not have a part of the configuration.

<Hardware Configuration of Client PC and Server Apparatus>

Figure 3:
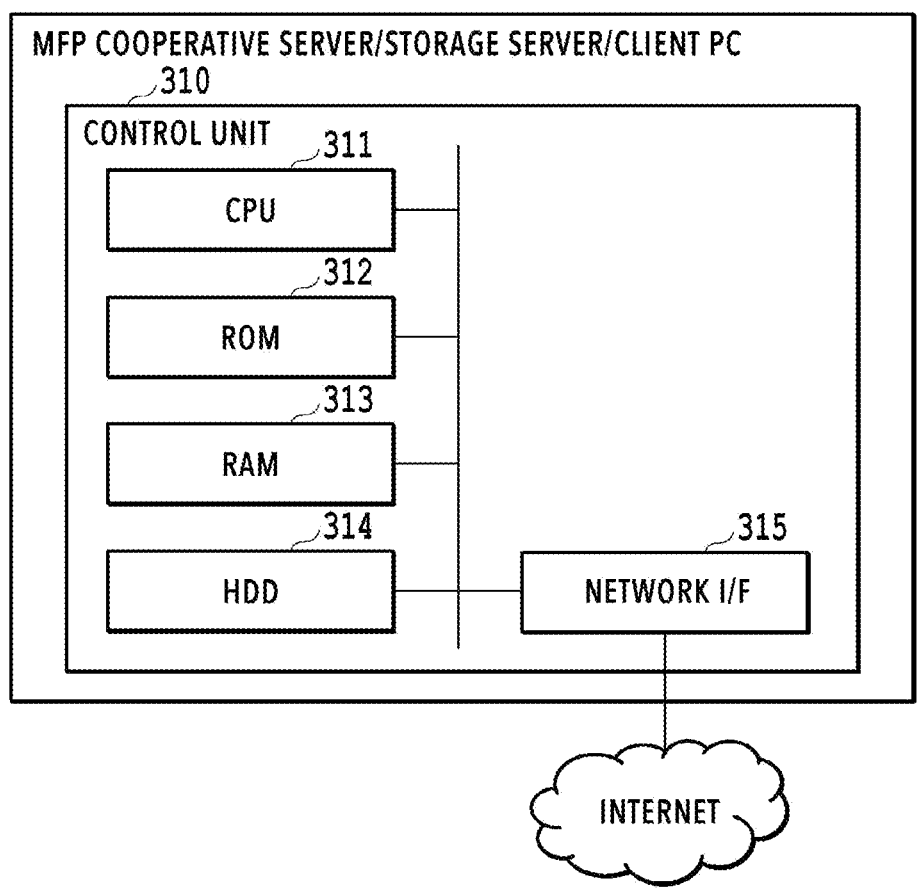
FIG. 3 is a block diagram showing a hardware configuration of an MFP cooperative server and a storage server.

FIG. 3 is a block diagram showing the hardware configuration of the client PC 111, the MFP cooperative server 120, and the storage server 130. The client PC 111, the MFP cooperative server 120, and the storage server 130 include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects the client PC 111/the MFP cooperative server 120/the storage server 13 to the internet. The MFP cooperative server 120 and the storage server 130 receive requests for various kinds of processing from other apparatuses (MFP 110, the client PC 111 and the like) via the network I/F 315 and return processing results in accordance with the requests.

<Software Configuration of Information Processing System>

Figure 4:
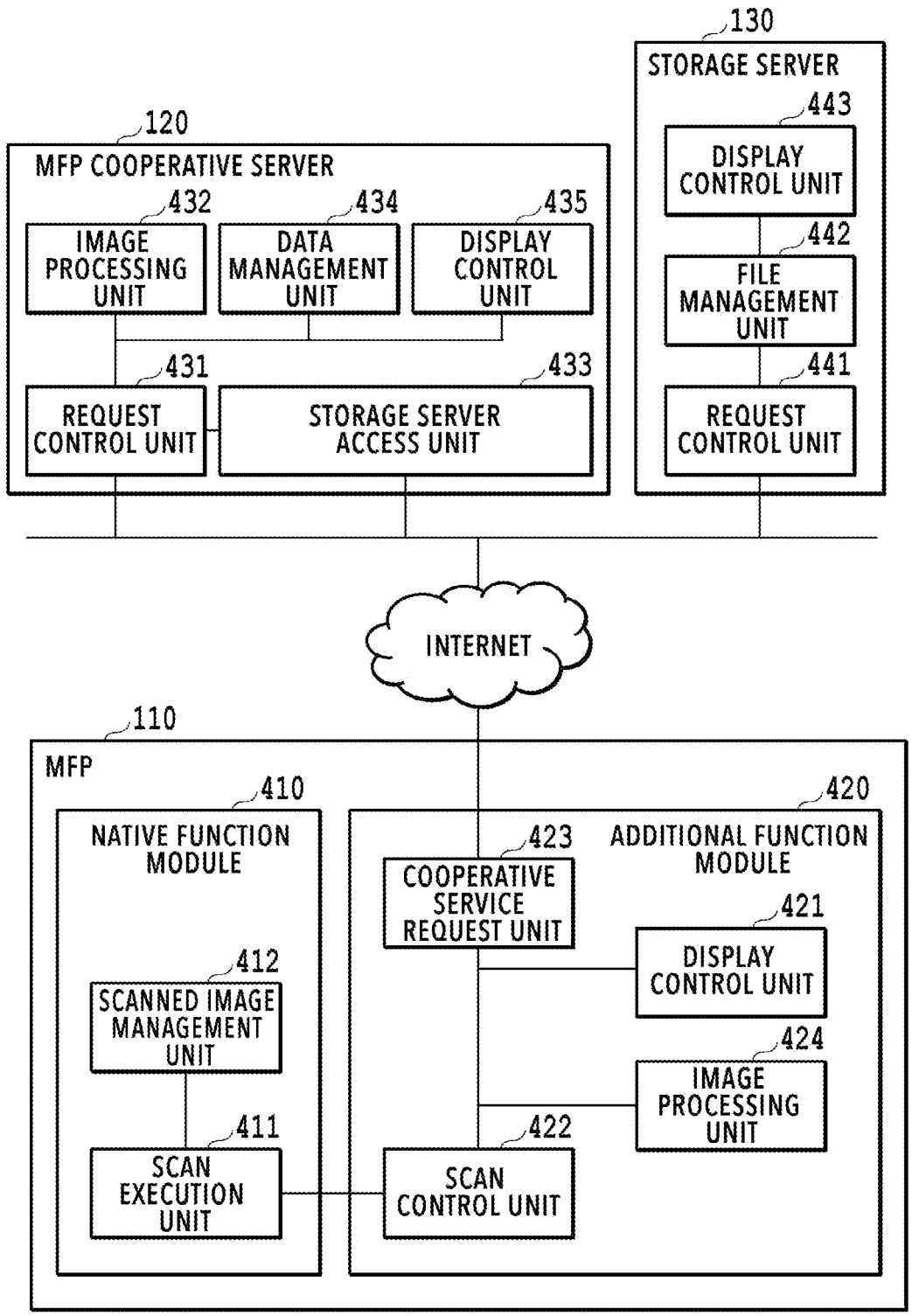
FIG. 4 is a block diagram showing a software configuration of the image processing system.

FIG. 4 is a block diagram showing the software configuration of the information processing system according to the present embodiment. In the following, the software configuration corresponding to the role of each of the MFP 110, the MFP cooperative server 120, and the storage server 130 is explained in order. In the following, explanation is given by narrowing the various functions possessed by each apparatus to the functions relating to the processing up to processing to file a scanned image obtained by scanning a document in the MFP 110 and store the file in the storage server 130 via the MFP cooperative server 120.

<<Software Configuration of MFP>>

The function modules of the MFP 110 are roughly divided into two modules, that is, a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, inputting of login authentication information for accessing the MFP cooperative server 120, scan setting, setting of a rule relating to folder allocation and file naming, instructions to start a scan, instructions to store a file and the like.

The scan control unit 422 gives instructions to perform scan processing to the scan execution unit 411 along with scan setting information in accordance with the user operation (for example, pressing down of "start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is stored in the HDD 214 by the scanned image management unit 412. At this time, the scan control unit 422 is notified of information on a scanned image identifier uniquely indicating the stored scanned image data. The scanned image identifier is a number, symbol, alphabet and the like for uniquely identifying the image scanned in the MFP 110. The scan control unit 422 acquires, for example, the scanned image data that is the target to be filed from the scanned image management unit 412 by using the above-described scanned image identifier. Then, the scan control unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, the communication protocol, such as REST and SOAP, is used.

The image processing unit 424 generates an image to be used on the UI screen that is displayed by the display control unit 421 by performing predetermined image processing for scanned image data.

<<Software Configuration of Server Apparatus>>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to image analysis processing, such as character area detection processing, character recognition processing, and similar document determination processing, for the scanned image data that is sent from the MFP 110. The storage server access unit 433 makes a request for processing to the storage server 130. The cloud service has made public a variety of interfaces for storing a file in the storage server, acquiring a stored file, and so on by using the protocol, such as REST and SOAP. The storage server access unit 433 makes a request to the storage server 130 by using an interface having been made public. The data management unit 434 stores and manages user information, various kinds of setting data and the like, which are managed in the MFP cooperative server 120. The display control unit 435 receives a request from a web browser running on the MFP 110 or the client PC 111 connected via the internet and returns screen configuration information (HTML, CSS and the like) necessary for the screen display. It is possible for a user to check the registered user information, change the scan setting and the setting of the rule relating to folder allocation and file naming via the screen that is displayed on the web browser.

Next, the software configuration of the storage server 130 is explained. The storage server 130 has a request control unit 441, a file arrangement unit 442, and a display control unit 443. The request control unit 441 stands by in the state of being capable of receiving a request from an external apparatus and in the present embodiment, instructs the file arrangement unit 442 to store a received file and read a stored file in response to a request from the MFP cooperative server 120. Then, the request control unit 441 returns a response in accordance with the request to the MFP cooperative server 120. The display control unit 443 receives a request from a web browser running on the MFP 110 or the client PC 111 connected via the internet and returns screen configuration information (HTML, CSS and the like) necessary for the screen display. It is possible for a user to check and acquire a stored file via the screen that is displayed on the web browser.

Although omitted in FIG. 4, it is assumed that the client PC 111 also comprises the same function module as the additional function module 420 described previously.

<Setting of Folder Allocation Rule>

Following the above, the setting of a rule relating to storage destination folder allocation in a scene in which a document scanned image is filed and stored in the storage server 130 is explained. In the present embodiment, explanation is given on the assumption that various settings including the folder allocation rule setting are performed in the client PC 111. The control of the display of various UI screens and storage of the set rule, to be described below, is implemented by the additional function module 420 described previously comprised by the client PC 111. That is, it is also possible to perform the contents that are described below by the MFP 110 comprising the additional function module 420.

Figure 5:
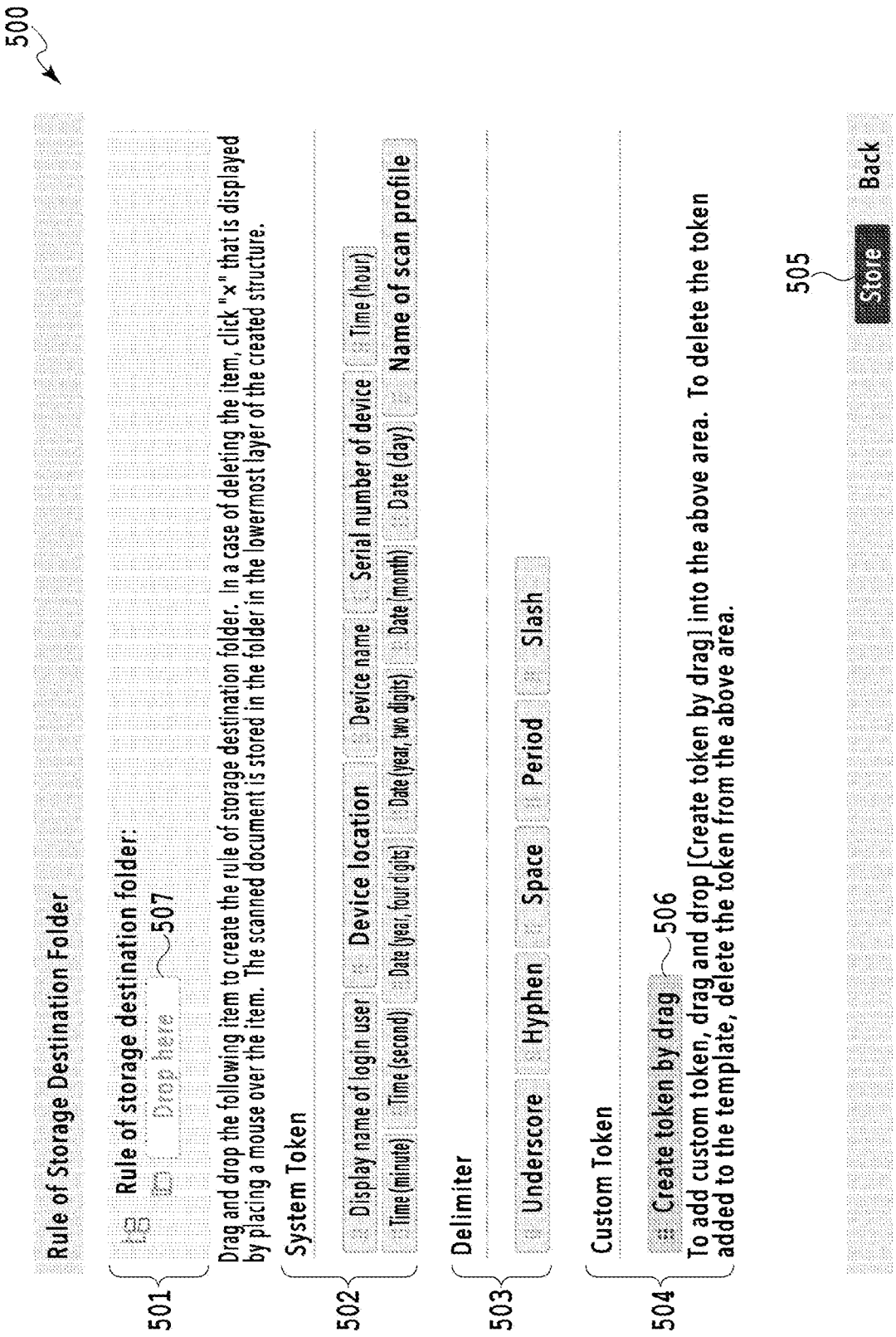
FIG. 5 is a diagram showing an example of a folder allocation rule setting screen.

FIG. 5 is a diagram showing an example of a UI screen (in the following, called "folder allocation rule setting screen") for a user to set a rule relating to a file allocation destination (storage destination folder), which is displayed on the display (not shown schematically) of the client PC 111. A file folder allocation rule setting screen 500 shown in FIG. 5 shows the initial display state and has four areas, that is, a rule editing area 501, a system token area 502, a delimiter token area 503, and a custom token area 504. Then, in the rule editing area 501, a token drop area 507 exists and further, at the bottom part on the screen, a "Store" button 505 for settling and storing the set rule exists.

In the present specification, "token" means a unit item for a user to designate a character string (including symbol) that is used for property information necessary at the time of storing a file in the storage server 130 with the attribute thereof in mind. Then, the token includes a general token (general item) corresponding to a character strong of the attribute determined in advance and a particular token (particular item) corresponding to a character string of an arbitrary attribute a user can customize and freely set. A system token and a delimiter token, to be described later, correspond to the general token and a custom token, to be described later, corresponds to the particular token. These tokens are represented as UI elements that are the target of the user operation, such as the drag operation and the drop operation, on various setting screens that appear in the following.

In the system token area 502, the delimiter token area 503, and the custom token area 504, various tokens are displayed in a list. Then, in the rule editing area 501, a folder allocation rule that is created by using various tokens is displayed. Here, the folder allocation rule includes information relating to the folder path of the allocation destination (storage destination folder) of scanned data and the hierarchical structure of the folder, and is set in advance by a user.

<Setting of Token>

It is possible for a user to select one from among the tokens displayed in the system token area 502, the delimiter token area 503, and the custom token area 504 by the drag operation and perform the drop operation of the token into the token drop area 507. As a result of that, a new folder is represented in a pseudo manner, which includes the character string corresponding to the token selected by the drag operation in the folder name (folder path).

The system token area 502 is an area in which the token that takes an environment variable of a user, such as "Display name of login user", "Time", and "Date", as the attribute value is displayed. The delimiter token area 503 is an area in which the token that takes the delimiter (symbol), such as "Underscore" and "Hyphen", as the attribute value is displayed. The custom token area 504 is an area in which the token that takes an arbitrary character string selected (or input manually) from the OCR results (recognized character string) of the scanned image as the attribute value. It is possible for a user to freely create the custom token. For example, in a case where a user drops a token 506 of "Create token by drag" displayed in the custom token area 504 into the token drop area 507, an input field for inputting an attribute name indicating the token is displayed. That is, the character string of "Create token by drag" displayed on the token 506 has a meaning different from that of the character string displayed on the system token and the delimiter token. In a case of the token 506, the token 506 is not the attribute name itself indicating the contents of the token but plays a role of an explanatory sentence prompting a user to input an attribute name and create a new token. Details of the custom token, such as a specific setting method of an attribute name that is attached to the custom token, will be described later.

The information on the rule displayed in the rule editing area 501 is transmitted to the MFP cooperative server 120 in response to pressing down of the "Store" button 505 and managed by the data management unit 434. Further, in a case where a "Back" button is pressed down, the rule being display in the rule editing area 501 is discarded and the setting processing is terminated.

Here, the storage destination folder allocation rule in the present embodiment is reviewed. First, it is assumed that restrictions are not imposed particularly on the combination and order of the tokens that can be set as the folder allocation rule. For example, it may also be possible to create a rule to configure one folder name only by the delimiter tokens in the delimiter token area 503 or it is also possible to create a rule using only the same system token. However, it is assumed that the contents of each token displayed in the system token area 502 and the delimiter token area 503 cannot be changed. On the other hand, as regards the custom token, it is assumed that the attribute name of the custom token displayed in the custom token area 504 can be changed freely and the custom token itself can be deleted.

Figure 6:
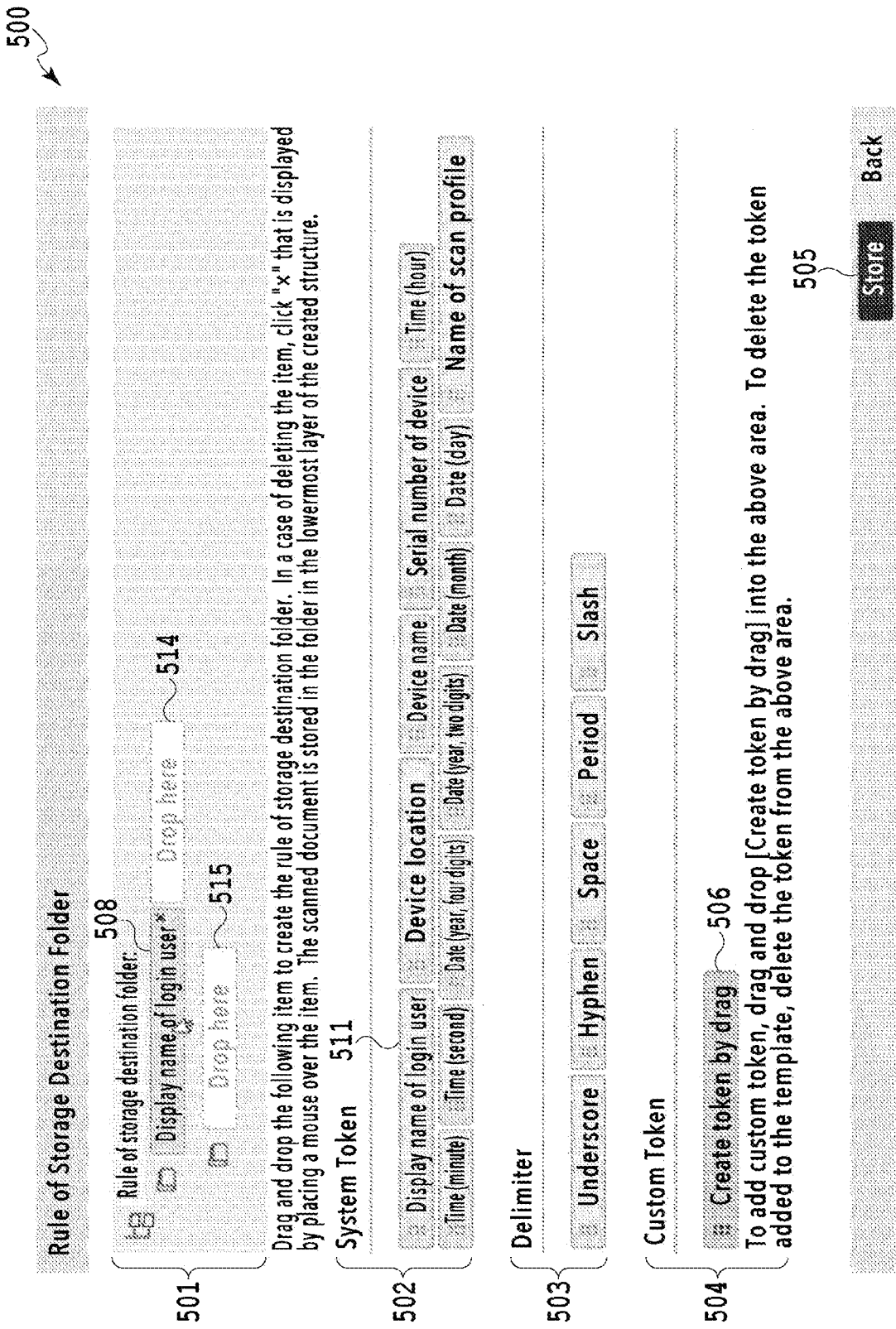
FIG. 6 is a diagram showing an example of the folder allocation rule setting screen.
Figure 7:
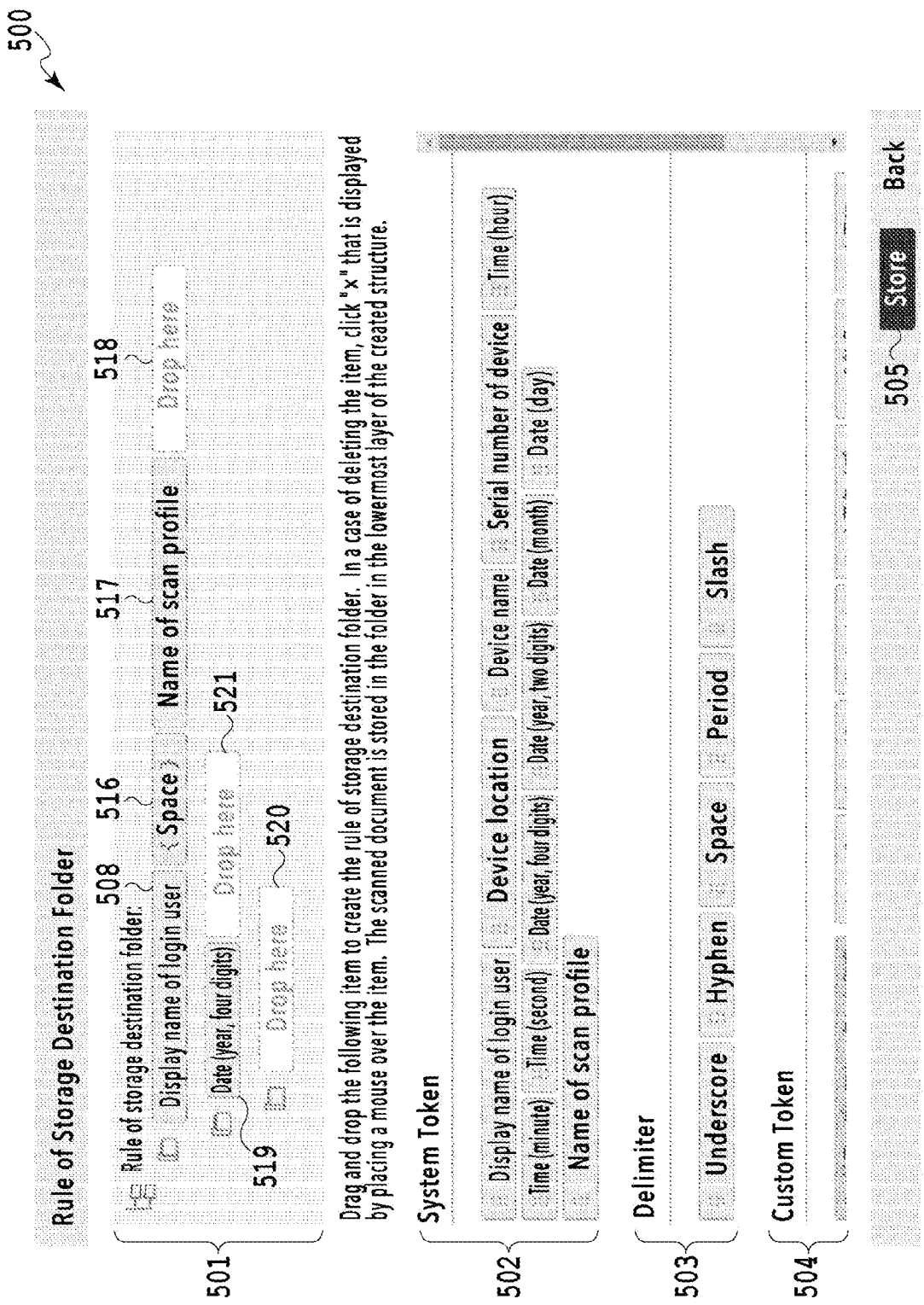
FIG. 7 is a diagram showing an example of the folder allocation rule setting screen.

FIG. 6 shows the state of the folder allocation rule setting screen 500 in a case where a user drags and drops an arbitrary system token within the system token area 502 into the rule editing area 501. Specifically, FIG. 6 shows the state in a case where a system token 511 that takes "Display name of login user" as the attribute name among the plurality of system tokens displayed within the system token area 502 is dropped into the token drop area 507. In the rule editing area 501 in FIG. 6, at the position of the token drop area 507 (see FIG. 5) at which a user has performed the drop operation, a token 508 that takes "Display name of login user" as the attribute name is arranged newly and at the same time as that, new token drop areas 514 and 515 are generated. In the state shown in FIG. 6, in a case where a user selects one token from the token groups existing in the various token areas 502 to 504 described above and drags and drops the token into the token drop area 514, a new token drop area is further generated (not shown schematically). Then, in a case where a user further drags and drops an arbitrary token into the newly generated token drop area, a further token drop area is generated. The state of the folder allocation rule setting screen 500 after the operation such as this is performed repeatedly is shown in FIG. 7. In the rule editing area 501 in FIG. 7, two tokens (token 516 that takes "{Space}" as attribute name and token 517 that takes "Name of scan profile" as attribute name) are newly added and further, a token drop area 518 is generated. In this case, the three tokens 508, 516, and 517 are set to the folder name of the folder in the first hierarchical layer (highest hierarchical layer). According to the example in FIG. 7, the folder that takes "(Display name of login user) (Name of scan profile)" as the folder path is created as the folder in the highest hierarchical layer. On the other hand, in the rule editing area 501 shown in FIG. 6, also in a case where a user drags and drops one arbitrary token into the token drop area 515 exiting in the second hierarchical layer, a new token drop area is generated further. In the rule editing area 501 in FIG. 7, a token 519 of "Date (year, four digits)" is added and two token drop areas 502 and 521 are further generated. The token drop area 521 is used at the time of adding a new token to the folder in the second hierarchical layer, which has determined to use the token 519. Further, the token drop area 520 is used at the time of setting the first token to the folder in the third hierarchical layer.

As is obvious from the explanation given so far, the hierarchical layer of the folder that uses the three tokens 508, 516, and 517 as the folder name and that of the folder that uses the token 519 as the folder name are different (see FIG. 7). That is, in the folder structure, the folder that uses the token 519 as the folder name exists in the layer lower than that of the folder that uses the three tokens 508, 516, and 517 as the folder name. Even for the tokens that are set in the rule editing area 501 as described above, it is possible to change the arrangement by the drag operation, such as exchanging adjacent tokens and inserting a token between tokens.

<<Deletion of Token>>

Figure 8:
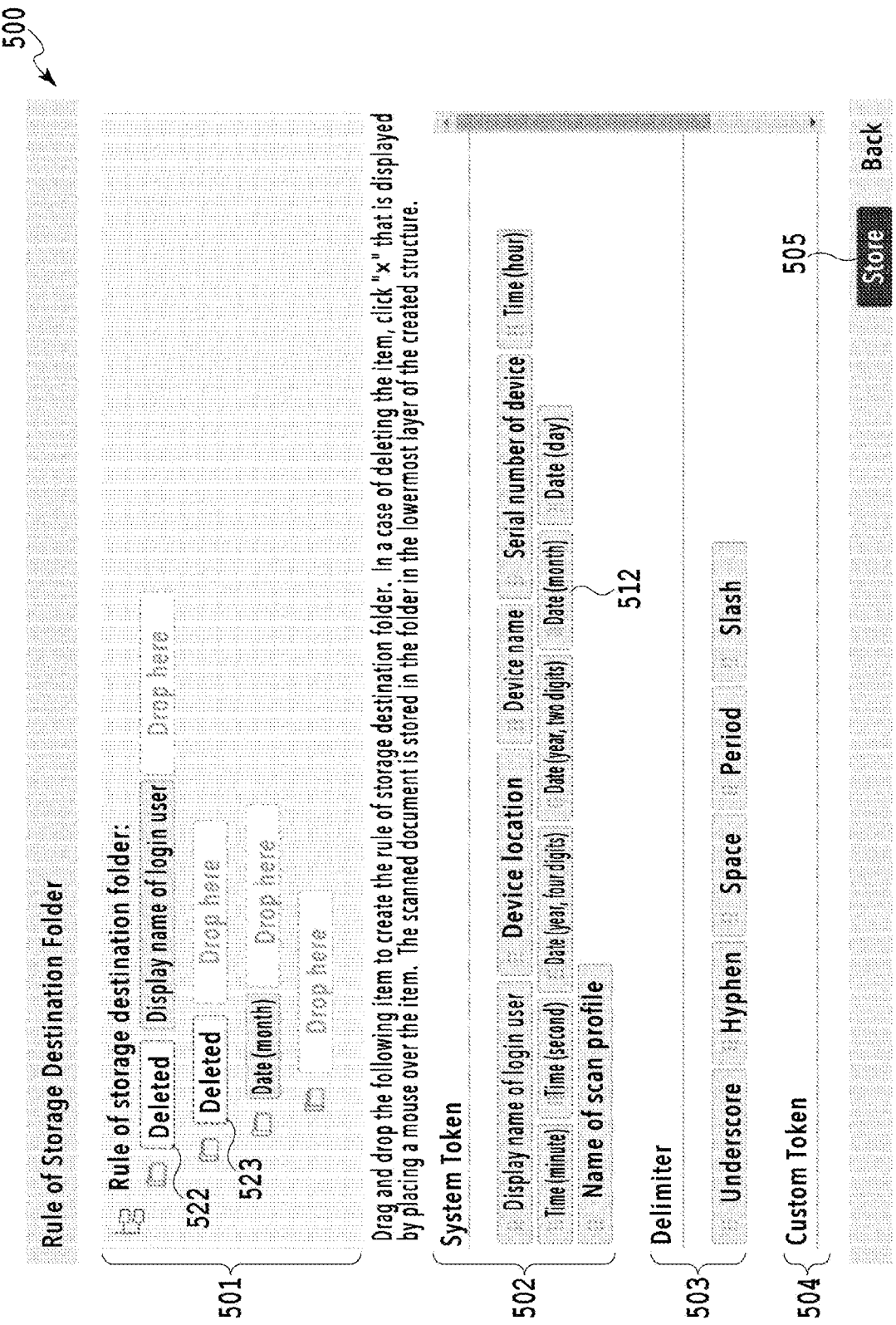
FIG. 8 is a diagram showing an example of the folder allocation rule setting screen.
Figure 9:
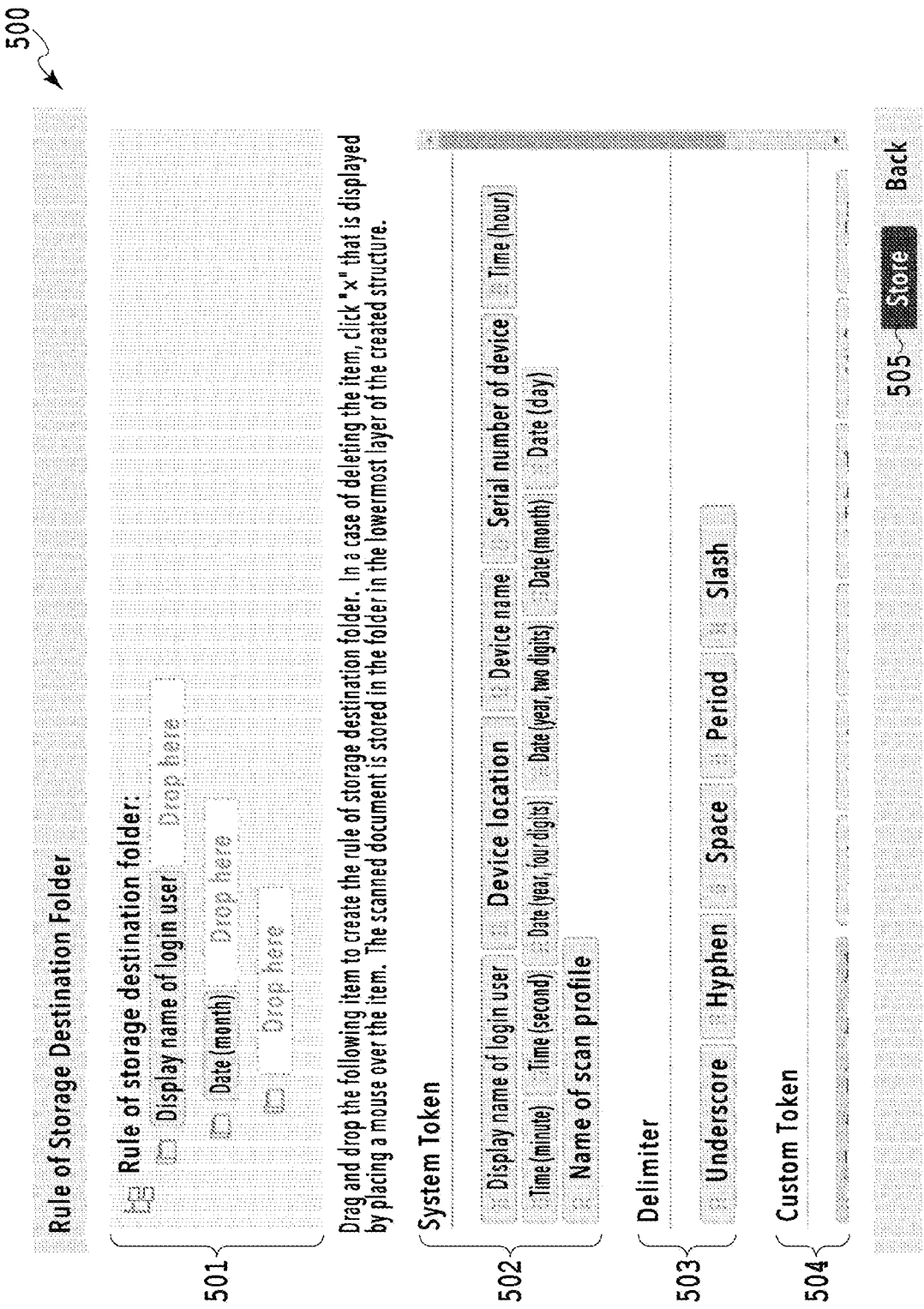
FIG. 9 is a diagram showing an example of the folder allocation rule setting screen.

Following the above, a case is explained where a user deletes a token in each folder hierarchical layer that is set as described above. In a case where a user performs the mouse hover operation for one of the tokens being displayed in the rule editing area 501, a "×" button (not shown schematically) is displayed on the token. It is possible for a user to delete any token by pressing down the "×" button. FIG. 8 shows the state of the folder allocation rule setting screen 500 after the token that is set in the rule editing area 501 is deleted by the above-described deletion operation. In the rule editing area 501 in FIG. 8, UI blocks 522 and 523 of "Deleted" are displayed at the positions at which tokens are deleted. These UI blocks 522 and 523 displayed as "Deleted" function as a token drop area and in a case where a user drags and drops a new token into the UI block, at the position displayed as "Deleted", a new token is set. As described above, in the present embodiment, even in a case where the token being displayed in the rule editing area 501 is deleted, the area in which the token has been present is maintained. However, it may also be possible to produce a display in which the area from which the token has been deleted is clipped in place of displaying the "Deleted" UI block and making it possible to arrange a new token therein. In a case where a user presses down the "Store" button 505 in the state in FIG. 8, the folder allocation rule setting screen 500 transitions to a state shown in FIG. 9 and the "Deleted" UI block is no longer displayed.

<<Check of Set Folder Allocation Rule>>

Figure 10:
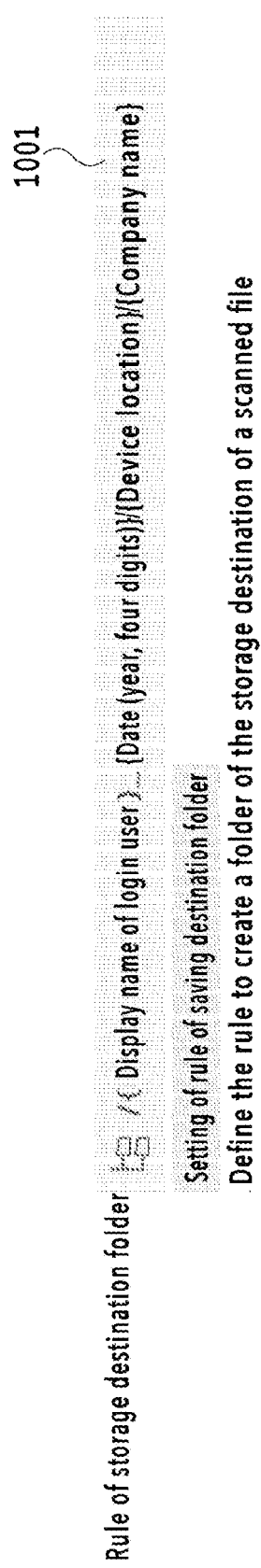
FIG. 10 is a diagram showing an example in a case where a set folder allocation rule is displayed.

FIG. 10 is a diagram showing an example of the state where a folder allocation rule created and stored by a user via the folder allocation rule setting screen 500 described previously is displayed on a main screen, not shown schematically. In the example shown in FIG. 10, a folder path 1001 in which the demarcation between folder hierarchical layers is indicated by a slash is displayed. The folder path 1001 shown in FIG. 10 corresponds to the results of setting a predetermined token to each of the folders in the first hierarchical layer to the third hierarchical layer as in the rule editing area 501 in FIG. 12, to be described later. In a case of following the tokens that are set in the rule editing area 501 shown in FIG. 8, the contents of the folder path that is displayed are "{Display name of login user}/Date (month)". That is, in a case of FIG. 8, the token for the folder in the second hierarchical layer is deleted and the folder path in accordance with the tokens that are set respectively to the folders in the first hierarchical layer and the third hierarchical layer is displayed. As described above, in a case where the token for the folder in a specific hierarchical layer no longer exists because the set token is deleted, the folder path in the state where the folder in the hierarchical layer is clipped is displayed.

<Custom Token>

Figure 11:
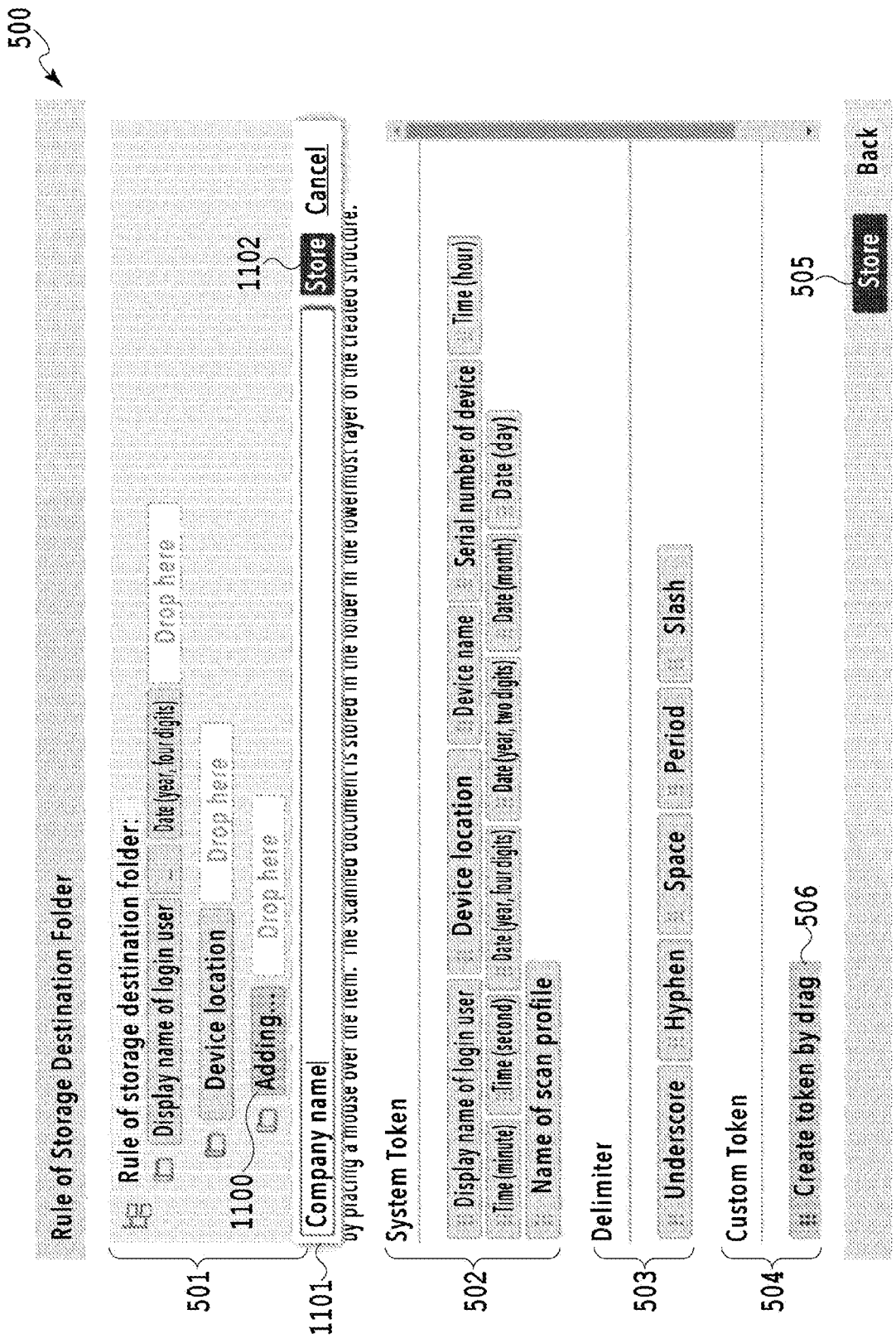
FIG. 11 is a diagram showing an example of the folder allocation rule setting screen.

Following the above, the user operation in a case where a folder allocation rule is set by using the custom token, which is the feature of the present embodiment, and transition of the UI screen accompanying the user operation are explained. FIG. 11 shows the state of the folder allocation rule setting screen in a case where a user drops the custom token 506 into the token drop area in the third hierarchical layer in the rule editing area 501. Here, in the token drop area for which the drop operation of the custom token 506 has been performed, a character string 1100 of "Adding . . . " is displayed and further, in a text field 1101 that is displayed in a pop-up manner in accordance with the drop operation, a character string of "Company name" is input. The character string that is input in the text field 1101 in this manner is set as the attribute name of the token for the folder in the third hierarchical layer by a "Store" button 1102 within the text field 1101 being pressed down. A "Cancel" button is used in a case where the setting of the custom token is cancelled.

Figure 12:
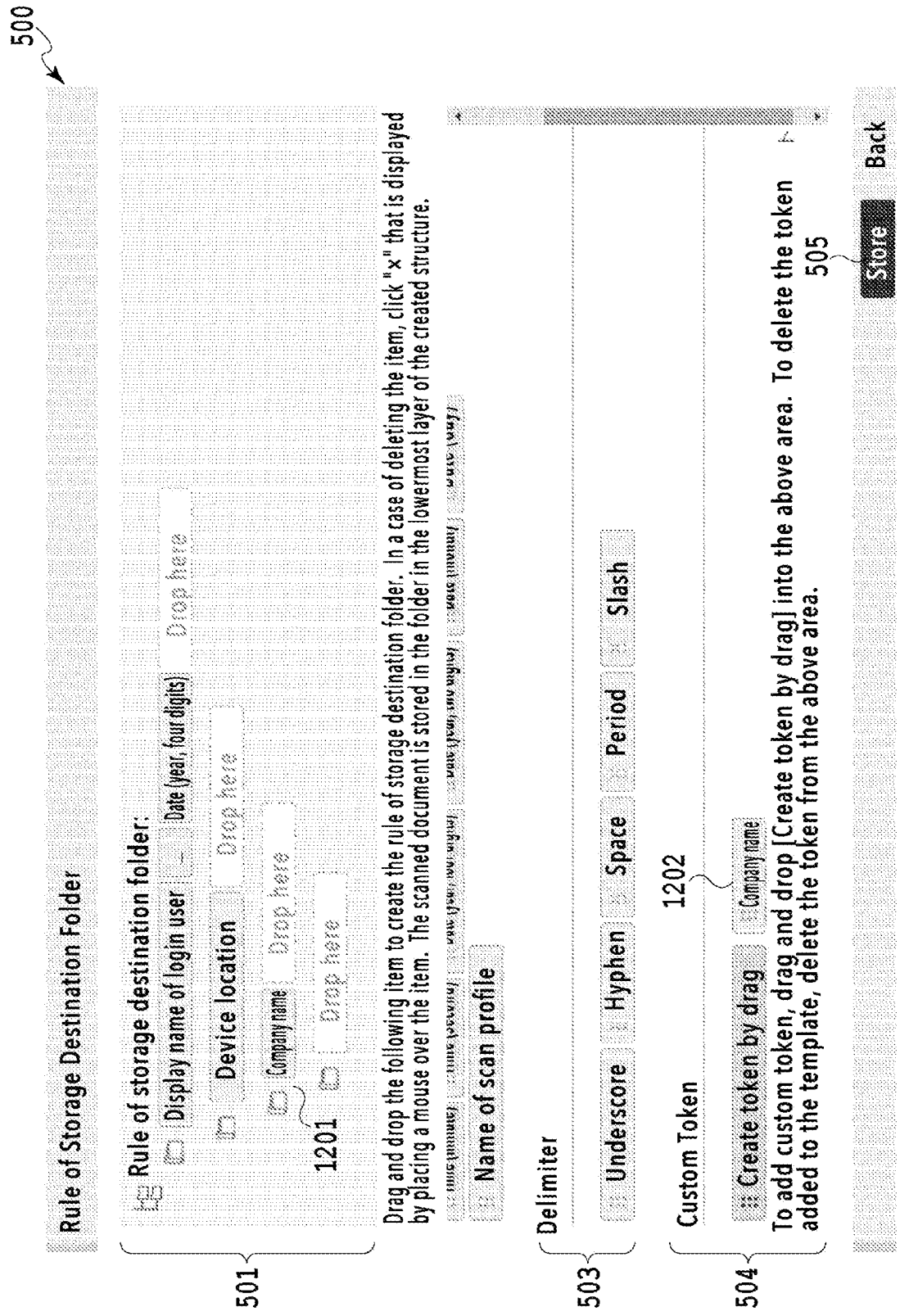
FIG. 12 is a diagram showing an example of the folder allocation rule setting screen.

FIG. 12 shows the state of the folder allocation rule setting screen 500 after the custom token is set by the "Store" button 1102 being pressed down by a user. A token 1201 having the character string "Company name" that is input in the text field 1101 described above as the attribute name is displayed as the token for the folder in the third hierarchical layer within the rule editing area 501. Further, in the custom token area 504, a custom token 1201 having the character string "Company name" as the attribute name is displayed so that it is possible to make use of again the custom token created this time. The timing at which the character string that is input in the text field 1101 is stored as the attribute name of the custom token that can be made use of again may be immediately after the attribute name is input in the text field 1101 (that is, before the "Store" button 1102 is pressed down). Further, it is assumed that also in a case where a token whose contents are the same as those of the attribute name already existing as the system token or the delimiter token is created as a new custom token, the token is added to the custom token area 504 as a new custom token. However, it is assumed that even in a case where the same character string as that of the attribute name of the custom token already existing in the custom token area 504 is input in the text field 1101, the custom token having the same attribute name is not displayed in the custom token area 504 in a duplicate manner. In a case where the character string that is already used as the attribute name of the already existing custom token is input in the text field 1101, it may also be possible to notify a user of this by displaying a message to the effect that the character string cannot be used as the attribute name, and so on. Alternatively, it may also be possible not to perform addition to the custom token area 504 while permitting the input of the above-described already used character string in the text field 1101 or the setting itself of the custom token based on the input. Further, it may also be possible to prevent, even in a case where a custom token having the same attribute name as that of the system token or the delimiter token is created, registration or utilization thereof as a custom token.

<Setting of Extraction Rule and Verification Rule of Custom Token>

A setting method of setting a character string extraction rule and a character string verification rule for a custom token is explained. In the present embodiment, explanation is given by taking a case as an example where the setting of the character string extraction rule and the character string verification rule is also performed in the client PC 111.

The character string extraction rule is a rule to normalize (extraction or deletion) a value that is input in the attribute value input field at the time of property setting. That is, the character string extraction rule is a rule that is referred to in a case where a specific character string is extracted or deleted from the value that is input in the attribute value input field. On the other hand, the character string verification rule is a rule to verify a value that is input in the attribute value input field at the time of property setting. In a case where the character string that is input in the attribute value input field is not in accordance with the specified format as a result of verifying the character string verification rule, a user is warned about that.

FIG. 24 is a diagram showing an example of a UI screen (in the following, called "custom token normalization rule setting screen") for a user to set the character string extraction rule and the character string verification rule that are displayed on the display of the client PC 111. A custom token normalization rule setting screen 2400 shown in FIG. 24 shows the initial display state. The display method of the custom token normalization rule setting screen 2400 is not limited in particular. For example, on the folder allocation rule setting screen 500 in FIG. 11 and FIG. 12, the custom token normalization rule setting screen 2400 is displayed at the timing a registered custom token is selected. Alternatively, it may also be possible to set a custom token registration screen (not shown schematically) separately and display the custom token normalization rule setting screen 2400 at the timing an "Add" button within the custom token registration screen is pressed down and an attribute name is input subsequently.

On the custom token normalization rule setting screen 2400, each setting item of Display name 2401, Default value 2402, Data extraction rule 2403, and Data verification rule 2404 exists. By inputting an arbitrary character string within the text field corresponding to each setting item, the setting value of each setting items is determined. In Display name 2401, an attribute name is set. In Default value 2402, it is possible to set a value that is input by default in the attribute value input field. In Data extraction rule 2403, it is possible to set the above-described character string extraction rule. In Data verification rule 2404, it is possible to set the above-described character string verification rule. Default value 2402, Data extraction rule 2403, and Data verification rule 2404 may be left empty or it may also be possible input values in an arbitrary combination thereof.

Further, the format in which a setting value is input in Data extraction rule 2403 and Data verification rule 2404 is not limited. For example, a format is considered in which alternatives are displayed in a pulldown format and a setting value is selected therefrom, in addition to a format in which a user directly inputs a regular expression. For example, in a case where it is desired to set a rule to delete the character string "Inc." included in the trade name as the character string extraction rule, it may also be possible to implement this by directly inputting ".+(?=Inc.)|(?<=Inc.).+" in Data extraction rule 2403. Further, in a case where it is desired to set a rule to verify whether an input character string includes only single-byte figures as the character string verification rule, it may also be possible to implement this by directly inputting "[0-9]+" in Data verification rule 2404. In place of the direct input such as this, as an example in which alternatives are displayed, for example, for the character string extraction rule, an alternative, such as "Delete trade name such as Inc." is displayed. Alternatively, it is considered to display alternatives, such as "Date format: YYYYMMDD" and "Date format:MM DD, YYYY", are displayed for the character string verification rule.

<Setting of File Naming Rule>

Figure 13:
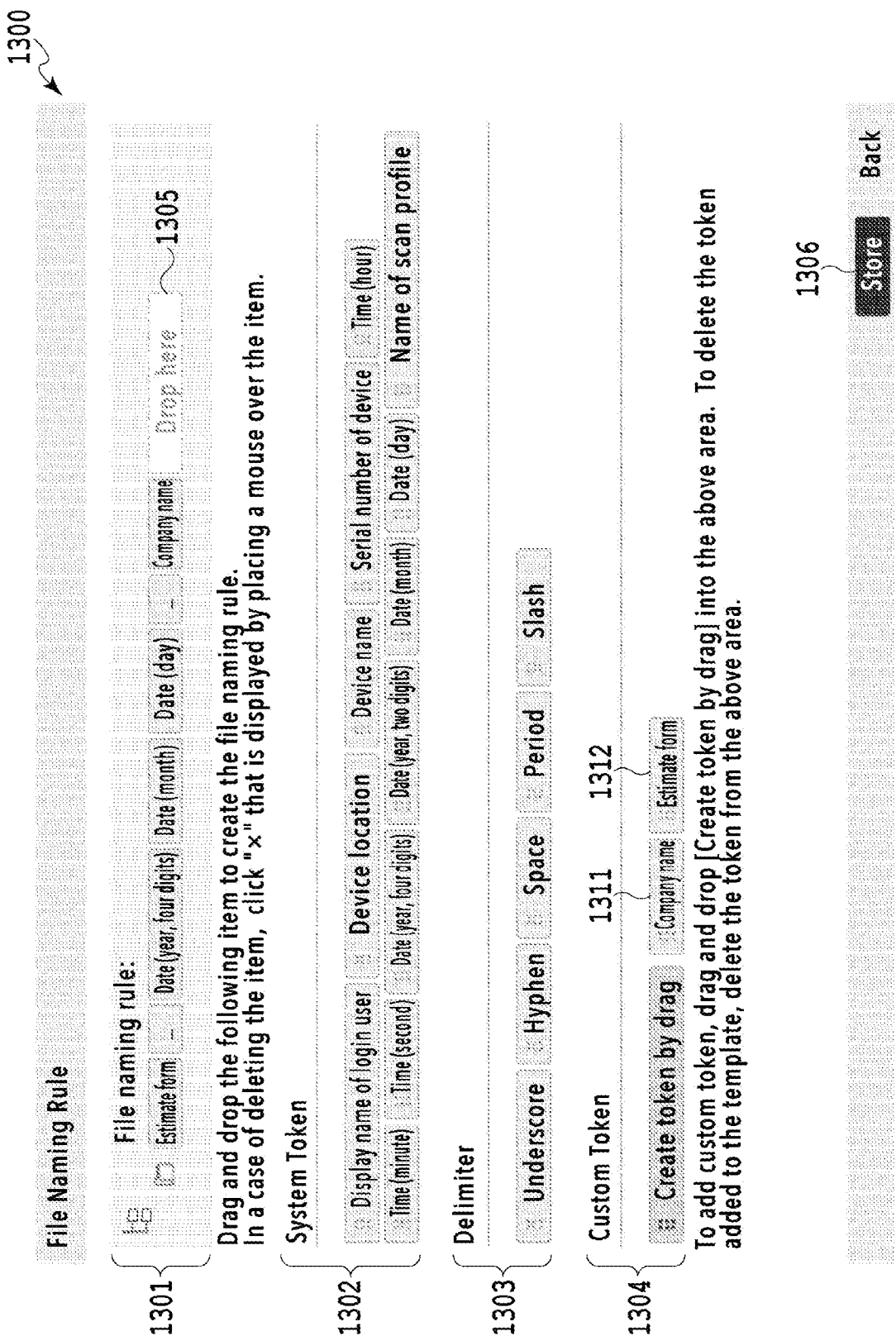
FIG. 13 is a diagram shown an example of a file naming rule setting screen.

Following the above, the setting of a naming rule relating to a file name that is attached in a case where a scanned image or the like is filed is explained. In the present embodiment, explanation is given by taking a case as an example where the setting of the file naming rule is also performed in the client PC 111. FIG. 13 is a diagram showing an example of a UI screen (in the following called "file naming rule setting screen") for a user to set a file naming rule, which is displayed on the display (not shown schematically) of the client PC 111. A File Naming Rule setting screen 1300 shown in FIG. 13 shows the initial display state and the screen configuration is similar to that of the folder allocation rule setting screen 500 described previously. That is, the File Naming Rule setting screen 1300 also has four areas, that is, a rule editing area 1301, a system token area 1302, a delimiter token area 1303, and a custom token area 1304. Then, in the rule editing area 1301, a token drop area 1305 exists and further, at the bottom part on the screen, a "Store" button 1306 for setting and storing the set file naming rule exists. In the following, points different from those of the folder allocation rule setting screen 500 are explained mainly.

The creation of a file naming rule is also performed by arranging various tokens displayed in the system token area 1302, the delimiter token area 1303, and the custom token area 1304 in the rule editing area 1301 by drag and drop. The difference from the folder allocation rule setting screen 500 lies in that in a case of a file name, the structure is not a hierarchical structure and even in a case where a new token is added to the rule editing area 1301, a plurality of token drop areas is not displayed.

One or a plurality of tokens arranged in the rule editing area 1301 is a component or components of a single file name. That is, in a case where a plurality of tokens is set, one file name is generated by connecting the attribute value of each token.

Here, in the custom token area 1304 on the File Naming Rule setting screen 1300, a custom token 1311 that takes "Company name" as the attribute name and a custom token 1312 that takes "Estimate form" as the attribute name are displayed. Of these two custom tokens, the custom token 1311 of "Company name" corresponds to the custom token 1202 that is created on the folder allocation rule setting screen 500 described previously. That is, the custom token 1311 is the custom token that is created at the time of setting of the folder allocation rule is displayed as a custom token that can be made use of also at the time of setting of the file naming rule. Similarly, the custom token 1312 of "Estimate form" that is displayed in the custom token area 1304 on the File Naming Rule setting screen 1300 is also displayed in the custom token area 504 after the creation thereof in a case where the folder allocation rule setting screen 500 is opened. In this manner, it is possible to share custom tokens between the folder allocation rule setting screen and the file naming rule setting screen.

<Property Setting at the Time of Filing>

Next, a flow of specific processing in the property setting at the time of filing a scanned image or the like is explained. Here, the property refers to a file name, a folder path, metadata and the like, which are necessary for each piece of filing-target data. For example, in a case where a certain document is scanned and filed, and stored in the storage server 130, a user sets a necessary property via a property setting screen on which the storage destination folder allocation rule and the file naming rule are reflected, which are set as described above.

Figure 14:
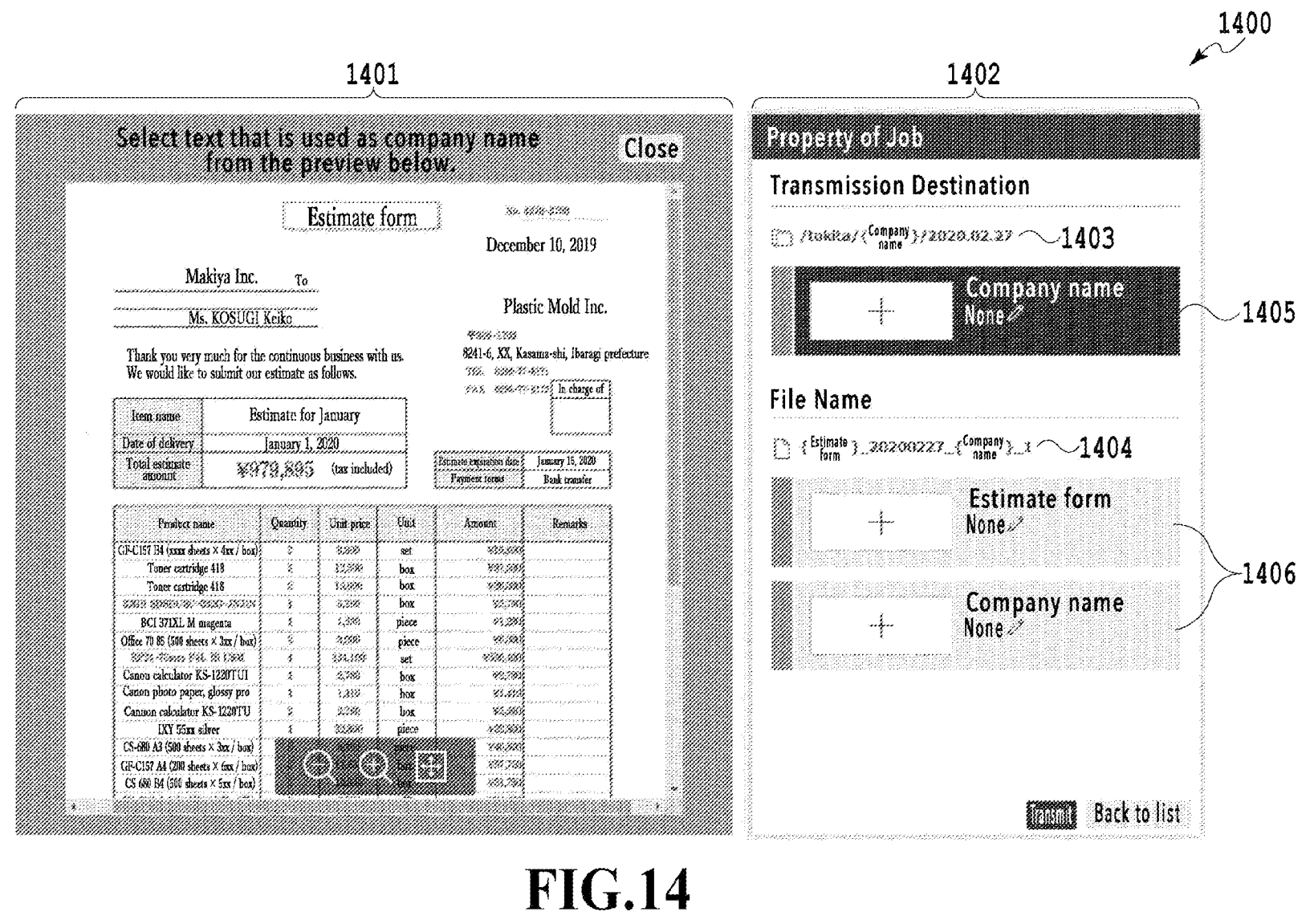

FIG. 14 is a diagram showing an example of the property setting screen. A property setting screen 1400 shown in FIG. 14 is in the initial display state and has a two-pane configuration of a preview pane 1401 and a property pane 1402. Here, within the preview pane 1401, the scanned image of a business form of "Estimate form" is preview-displayed. In the preview pane 1401, it is possible to display an arbitrary position in the scanned image by scrolling and zooming the scanned image. The property pane 1402 is a pane for displaying and editing a property to be attached to the processing-target scanned image. Here, within the property pane 1402, a folder path display area 1403, a file name display area 1404, an attribute value input field 1405 corresponding to a folder path, and an attribute value input field 1406 corresponding to a file name are displayed. Then, "/tokita/{Company name}/2020.02.27" displayed in the folder path display area 1403 is based on the folder allocation rule that is set on the folder allocation rule setting screen 500 described previously. Further, "{Estimate form}_20200227_{Company name}_1" displayed in the file name display area 1404 is based on the file name naming rule that is set on the File Naming Rule setting screen 1300. Details of the display of a folder path and a file name based on each rule will be described later.

<Flow of Property Setting Processing>

Figure 15:
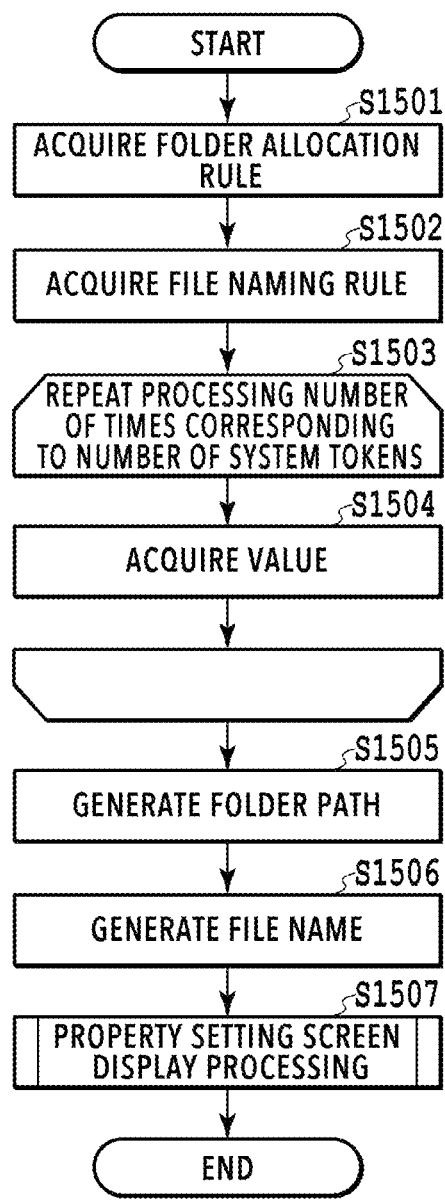
FIG. 15 is a flowchart showing a flow of processing at the time of setting a property.
Figure 16A:
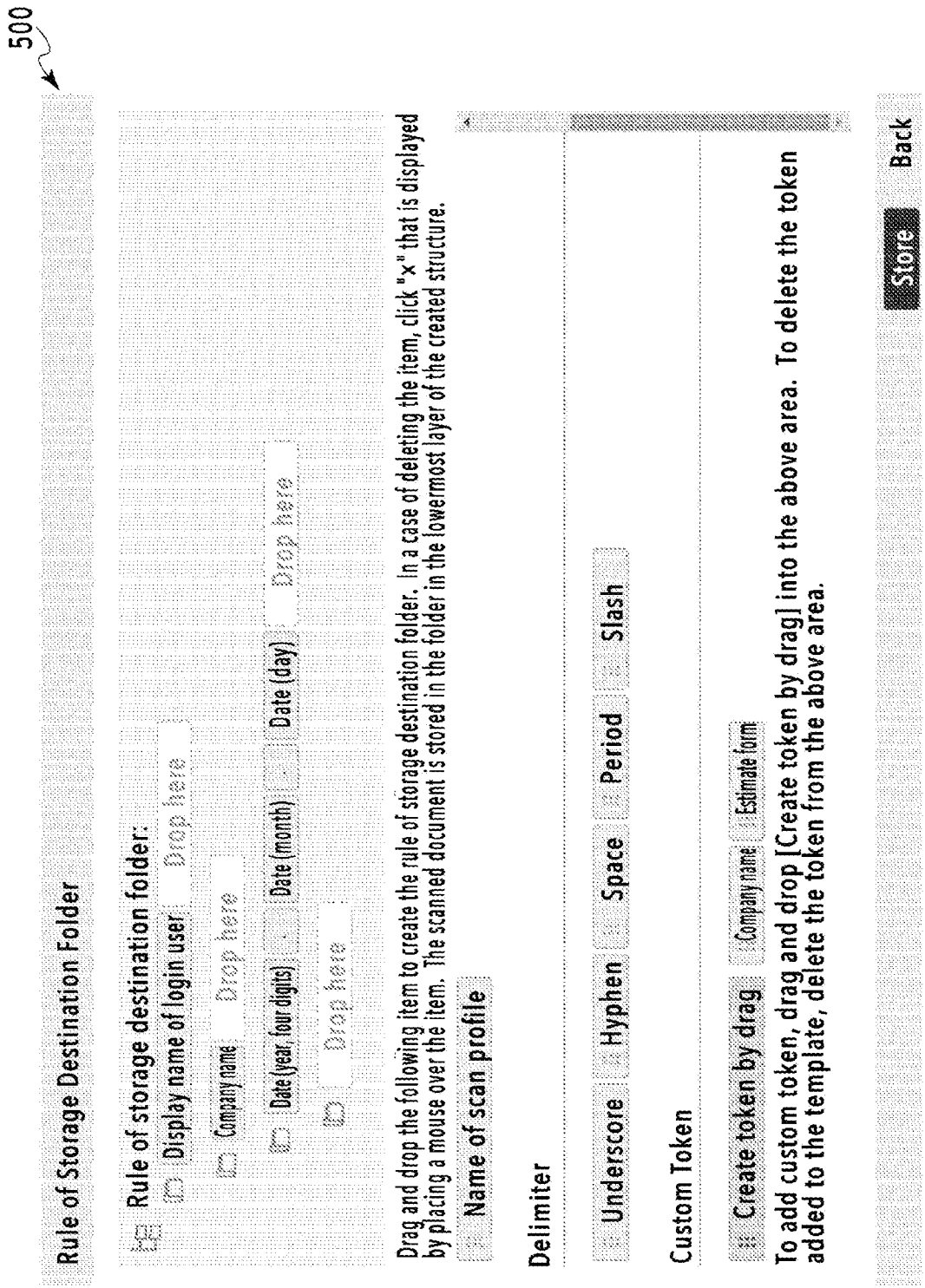
FIG. 16A is a diagram showing an example of the folder allocation rule setting screen and FIG. 16B is a diagram showing an example of the file naming rule setting screen.
Figure 16B:
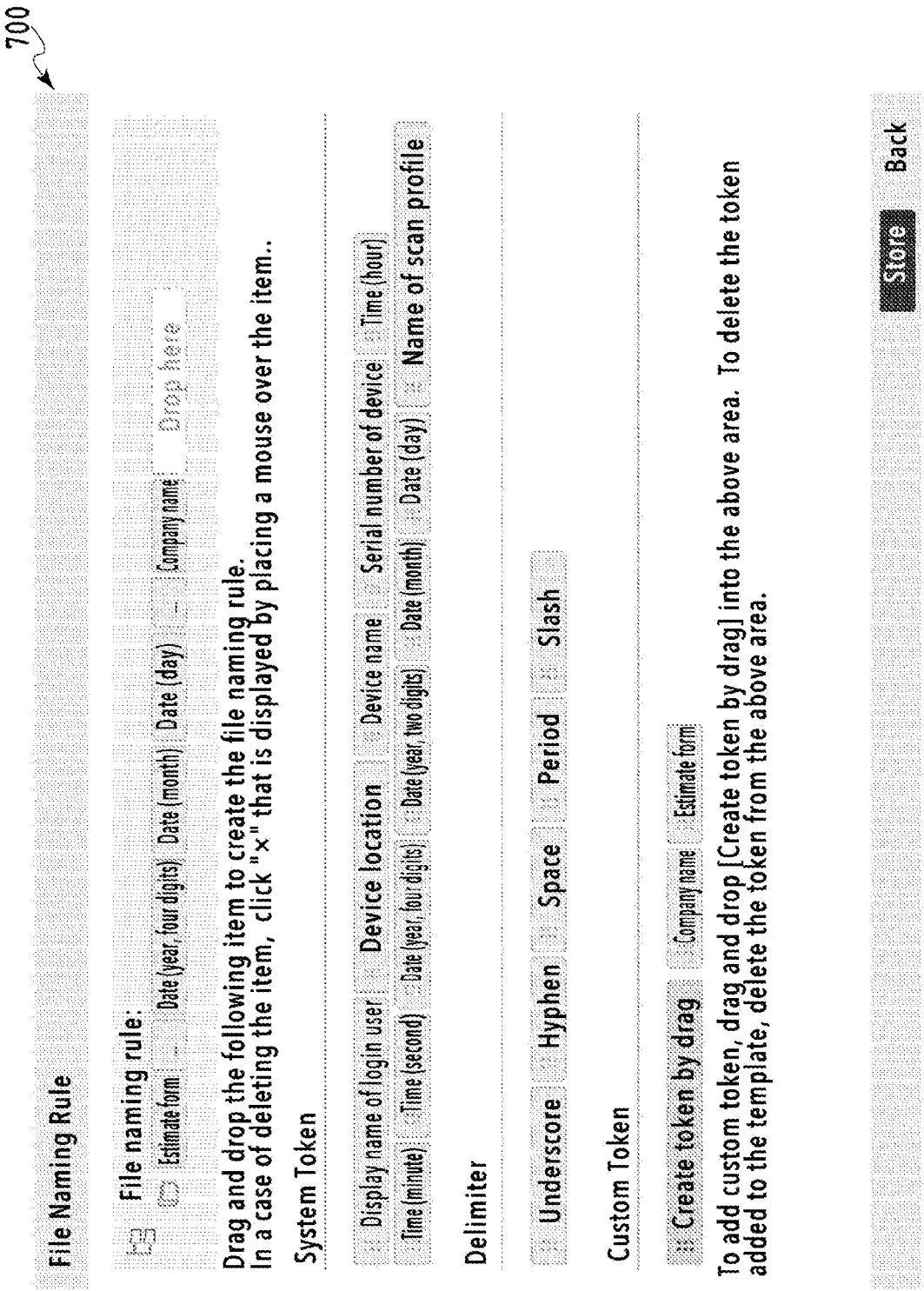

FIG. 15 is a flowchart showing a flow of processing at the time of a user setting a property of a file via the above-described property setting screen 1400 on the MFP 110. The execution of this flow starts by the display control unit 421 of the MFP 110 receiving user instructions to open the property setting screen 1400 as a trigger. Here, it is assumed that as the folder allocation rule and the file naming rule, the following contents shown on the setting screens in FIG. 16A and FIG. 16B are set respectively.

<<Setting Contents of Folder Allocation Rule>>

"'Display name of login user' (system token)/'Company name' (custom token)/'Year' (system token) 'period' (delimiter token) 'Month' (system token) 'period' (delimiter token) 'Day' (system token)"

<<Setting Contents of File Naming Rule>>

"'Estimate form (custom token)' 'Underscore (delimiter token)' 'Year (system token)' 'Month (system token)' 'Day (system token)' 'Underscore (delimiter token)' 'Company name (custom token)'"

<<Setting Contents of Custom Token Normalization Rule of Company Name (Custom Token)>>

"Display name:Company name, Default value:Empty, Data extraction rule:".+(?=Inc.|(?<=Inc.).+" (Delete Inc. at top or end), Data verification rule:".+" (not Empty)

In the following, a detailed explanation is given along the flow in FIG. 15. In the following explanation, symbol "S" represents a step.

First, at S1501, information on the folder allocation rule that is set by a user is acquired. At S1502 that follows, information on the file naming rule that is set by a user is acquired. At next S1503 and S1504, processing to acquire the attribute value of the system token included in the information acquired at S1501 and S1502 is repeated the number of times corresponding to the number of system tokens. Specifically, the character string corresponding to the environment variable of a user, which corresponds to the system token, is acquired from the data management unit 434 of the MFP cooperative server 120. For example, for the system tokens "Year", "Month", and "Day", character strings "2020", "2", and "27" representing the date of the scan are acquired, respectively. Further, for the system token "Display name of login user", the character string "tokita" representing the user name of the user registered in the system is acquired. In the case of the above-described example, the four system tokens are included in the folder allocation rule and the three system tokens are included in the file naming rule, and therefore, the attribute value acquisition is repeated seven times. In a case where no system token is included in each rule, the processing at S1503 and S1504 is skipped and the processing advances to step S1505. The attribute value of the system token changes dynamically in accordance with the system setting, unlike those of the custom token and the delimiter token. Because of this, it is necessary to update the corresponding character string (attribute value) of each system token each time the system setting is changed.

At S1505, by using the folder allocation rule acquired at S1501 and the character string of each system token, which is acquired at S1504, a folder path is generated. At S1506 that follows, by using the file naming rule acquired at S1502 and the character string of each system token, which is acquired at S1504, a file name is generated. At this time, as regards the delimiter token, the relevant delimiter, such as a period and a space, is input. Further, as regards the custom token, the character string of the corresponding attribute name is input temporarily.

Figure 17:
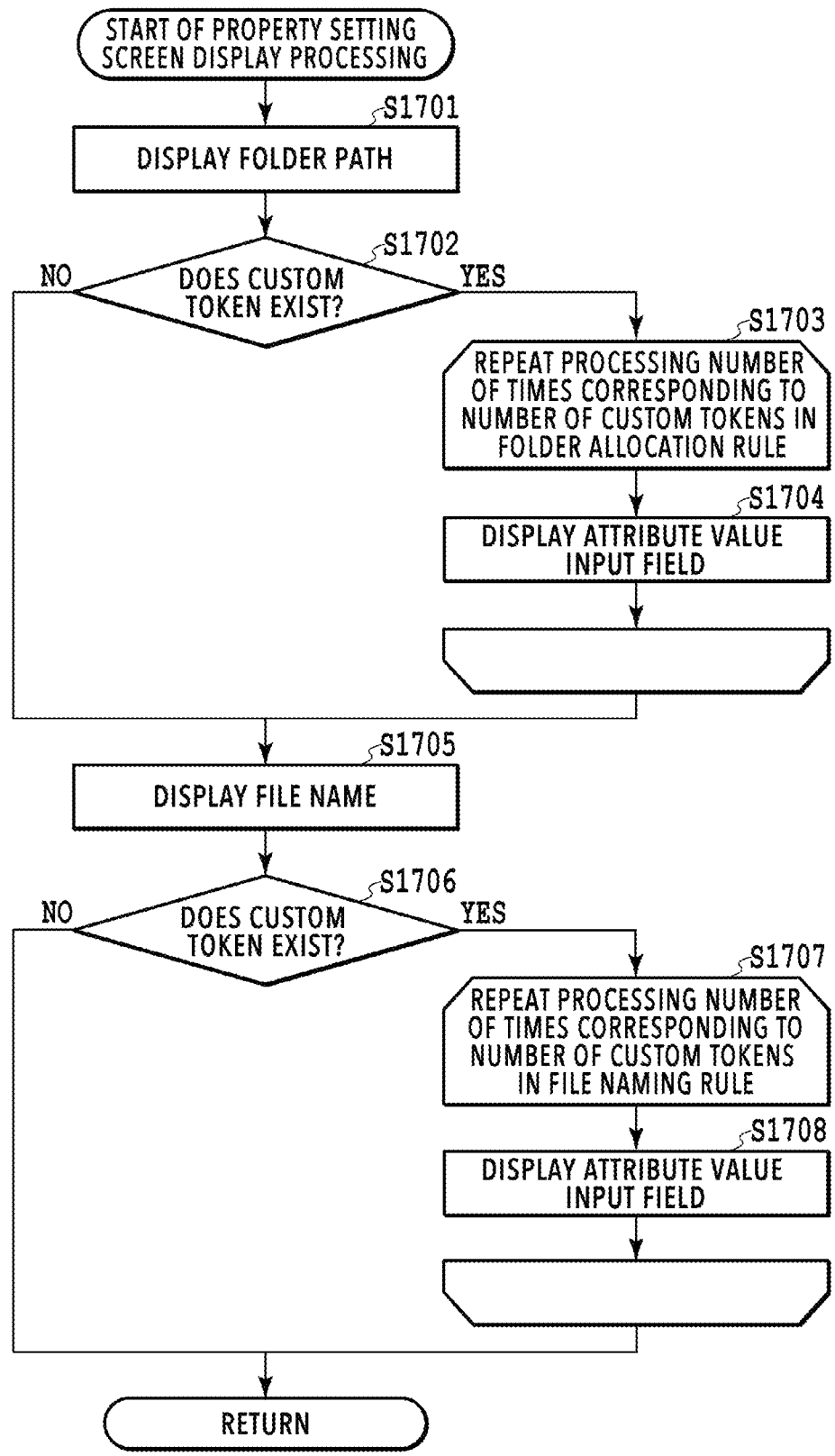
FIG. 17 is a flowchart showing details of property setting screen display processing.

At next S1507, the property setting screen 1400 described previously is displayed on the display (not shown schematically) of the client PC 111. FIG. 17 is a flowchart showing details of property setting screen display processing. In the following, a detailed explanation is given along the flow in FIG. 17.

At S1701, the folder path generated at S1505 is displayed in the folder path display area 1403 on the property setting screen 1400. As described previously, in the example in FIG. 14, "/tokita/(Company name)/2020.02.27" is displayed. In this case, for the system token that takes "Display name of login user" as its attribute name, the character string "tokita" is input. Further, for the custom token that takes "Company name" as its attribute name, a character string is to be input by, for example, selecting a desired text block from the scanned image, and therefore, in the current stage, the character string of "Company name" indicating the attribute name is input temporarily. Then, for each system token that takes each of "Year", "Month", and "Day" as its attribute name, figures "2020", "02", and "27" representing the date of acquisition of the scanned image within the preview pane 1401 are input with ". (Period)" that is the delimiter token being sandwiched in between. In a case where the date of execution of the scan changes, the figures allocated to these system tokens change each time.

At S1702, whether or not a custom token is included in the folder allocation rule acquired at S1501 is determined. In a case where a custom token is included, the processing advances to S1703 and in a case where no custom token is included, the processing advances to S1705. In the example described above, the custom token that takes "Company name" as the attribute name is included, and therefore, the processing advances to S1703.

At S1703 and S1704, processing to display the attribute value input filed 1405 for the custom token is repeated the number of times corresponding to the number of custom tokens included in the folder allocation rule. In the example described above, one custom token is included in the folder allocation rule, and therefore, one attribute value input field is displayed (see FIG. 14), but in a case where a plurality of custom tokens is included, a plurality of attribute value input fields is displayed. In a case where no custom token is included in the folder allocation rule (No at S1702), the attribute value input field is not displayed.

At next S1705, the file name generated at S1506 is displayed in the file name display area 1404 on the property setting screen 1400. As described previously, in the example in FIG. 14, "{Estimate form}_20200227_{Company name}_1" is displayed. In this case, for the system tokens of "Year", "Month", and "Day", figures of "2020", "02", and "27" representing the date of acquisition of the scanned image within the preview pane 1401 are displayed in the state of being connected without using delimiters. Further, for the custom tokes that take "Estimate form" and "Company name" as the attribute names respectively, as described above, the character strings indicating the attribute names respectively are input temporarily.

At S1706, whether or not a custom token is included in the file naming rule acquired at S1502 is determined. In a case where a custom token is included, the processing advances to S1707 and in a case where no custom token is included, this processing is exited. Here, as described above, the custom tokens that take "Estimate form" and "Company name" as the attribute names respectively are included, and therefore, the processing advances to S1707.

At S1707 and S1708, processing to display the attribute value input field 1406 for the custom token is repeated the number of times corresponding to the number of custom tokens included in the file naming rule. In the example described above, two custom tokens are included in the file naming rule, and therefore, two attribute value input fields 1406 are displayed (see FIG. 14). In a case where no custom token is included in the file naming rule (No at S1706), the attribute value input field 1406 is not displayed.

The above is the contents of the property setting screen display processing. As described above, in the present embodiment, at the time of creating a rule for a folder path or a file name, it is possible to use a common token (custom token, system token). Then, even though a common token is used, the folder path and the file name are displayed in a distinct manner in the property pane 1402.

Figure 18:
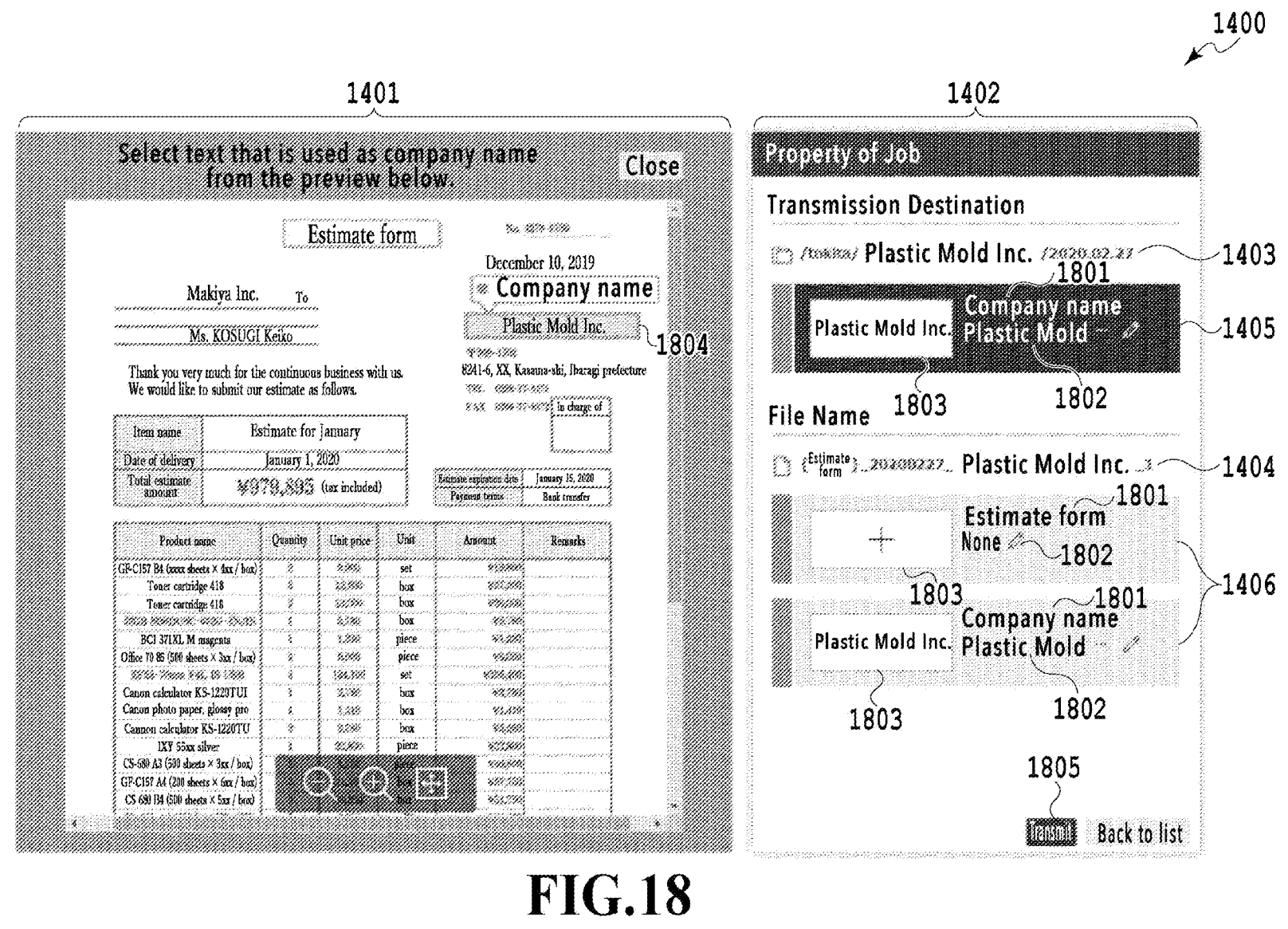

FIG. 18 shows the way the attribute value of a custom token is input by a user on the property setting screen 1400 after the property setting screen display processing described above is completed. In the attribute value input fields 1405/1406 corresponding to each custom token, an attribute name 1801, an attribute value 1802, and a cutout image 1803 corresponding to the attribute value are displayed. In a case where a user has not selected yet a text block including the attribute value (character string) of the custom token from the preview pane 1401, the attribute value 1802 is displayed as "None (empty)" as in the attribute value input field 1406 of the custom token that takes "Estimate form" as the attribute name. Further, the cutout image 1803 corresponding to the attribute value is also blank.

A user who inputs the attribute value of a custom token first selects the attribute value input field of the target custom token from among the attribute value input fields displayed in the property pane 1402. Here, in FIG. 18, the attribute value input field 1405 is selected and highlighted. In this state, a user designates (for example, performs the click operation for) a text block including the attribute value (character string) of a custom token from the scanned image displayed in the preview pane 1401. The text block for which the click operation has been performed is highlighted by being attached with a fame line or a color within the preview pane 1401. At the same time as this, in the attribute value input field 1405 being selected within the property pane 1402, the character string included in the designated text block is displayed as the attribute value 1802. At this time, in the attribute value 1802, the value after the data extraction rule and the data verification rule set on the "custom token normalization rule setting screen" described previously are applied is displayed. Further, the image portion corresponding to the text block is displayed as the cutout image 1803 corresponding to the attribute value. In a case where the attribute value is input to the custom token, the contents thereof are reflected in the folder path display area 1403 and the file name display area 1404.

Figure 25:
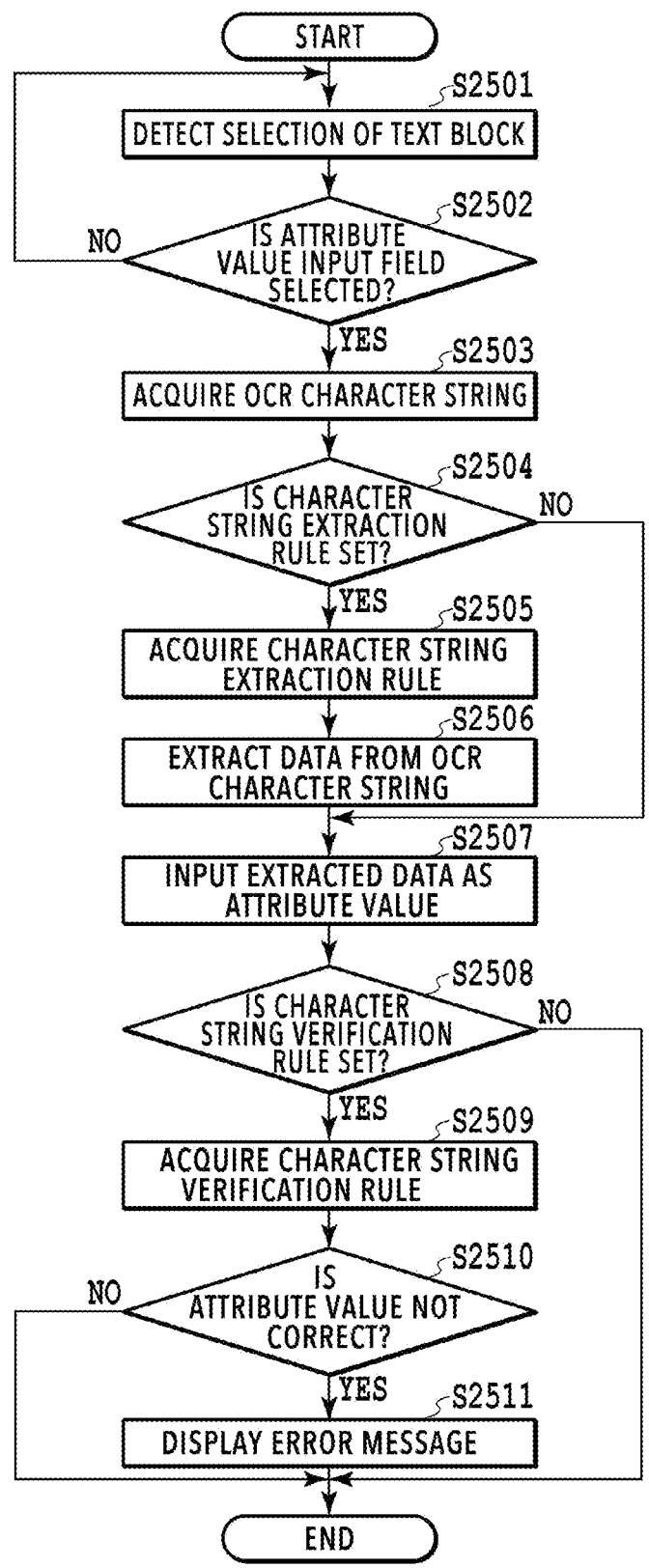
FIG. 25 is a flowchart showing details of processing in which an attribute value of a custom token is input on the property setting screen.

Here, with reference to a flowchart shown in FIG. 25, processing is explained in which the value of a text block selected by a user is input in the attribute value input field. In the following explanation, symbol "S" represents a step.

First, at S2501, the selection operation of a text block by a user is detected. At S2502 that follows, whether the attribute value input field is selected is determined. In a case where the attribute value input field is not selected, the processing returns to S2501. In a case where the attribute value input field is selected, the processing transitions to S2503.

At S2503, an OCR character string of the text block selected by the user is acquired. Specifically, a request to analyze the text block related to the selection is transmitted from the cooperative service request unit 423 to the MFP cooperative server 120 and the image processing unit 432 performs OCR processing based on the request. Then, the results of execution of the OCR processing are returned to the cooperative service request unit 423 and the display control unit 421 acquires the execution results. For example, in the property pane 1402, in the state where the attribute value input field 1405 of the custom token that takes "Company name" as the attribute value is selected, the user clicks a text block 1804 of "Plastic Mold Inc." in the preview pane 1401. Then, the OCR processing is performed for the text block 1804 as described above and "Plastic Mold Inc." is acquired as the OCR character string.

Following the above, at S2504, whether the character string extraction rule is set to the selected attribute value input field is determined. In a case where the rule is not set, the processing transitions to S2507 and in a case where the rule is set, the processing transitions to S2505.

At S2505, the character string extraction rule that is set is acquired. Here, it is assumed that the character string extraction rule whose contents are "Delete "Inc." included in the trade name" is acquired. At S2506 that follows, data that is the attribute value is extracted in accordance with the character string extraction rule from the OCR character string acquired at S2503. Here, the OCR character string of "Plastic Mold Inc." is acquired, and therefore, "Plastic Mold" is extracted, which is obtained by excluding "Inc." from "Plastic Mold Inc.".

At next S2507, the attribute value is input in the attribute value input field. Here, the character string of "Plastic Mold" is input in the attribute value input field 1405 as the attribute value. In a case where the attribute value is input as described above, the portion of "{Company name}" in the folder path display area 1403 is replaced with "Plastic Mold". Further, in the file naming rule also, the custom token that takes "Company name" as the attribute name is set, and therefore, synchronization processing is performed for the attribute value input field 1406 thereof. That is, the portion of "{Company name}" in the file name display area 1404 is also replaced with "Plastic Mold" similarly. In a case where a method other than the method of designating an arbitrary text block from the preview pane 1401 is used, for example, in a case where the character string that is the attribute value is input manually by using a soft keyboard (not shown schematically) or the like, the synchronization processing is also performed. That is, irrespective of the input method of the attribute value, the same attribute value is set to the common custom tokens. In a case where the attribute value input field for the custom token for which the attribute value has already been set is selected and a text block different from the text block currently being designated is designated, the existing attribute value is overwritten by the attribute value newly input.

Following the above, at S2508, whether the character string verification rule is set to the selected attribute value input field is determined. In a case where the rule is not set, the processing is terminated. In a case where the rule is set, the processing transitions to S2509. At S2509, the character string verification rule that is set is acquired. Then, at S2510, the attribute value that is input at S2507 is verified in accordance with the character string verification rule acquired at S2509. In a case whether the attribute value is not correct as a result of the verification, the processing transitions to S2511 and a message to the effect that the input attribute value is not correct is displayed (not shown schematically). On the other hand, in a case where there is no problem in the results of the verification, this processing is terminated.

The user having completed the above-described processing for all the custom tokens presses down a "Transmit" button 1805. Due to this, the data of the scanned image is sent from the MFP 110 to the MFP cooperative server 120 along with the information on the folder path and the file name, which are set on the property setting screen 1400. Then, in the MFP cooperative server 120, the storage server access unit 433 files the data of the scanned image by attaching the designated file name thereto by making use of the received information and data and stores the file in the designated folder of the cloud server 130. In a case where the user presses down the "Transit" button 1805 in the empty state where the attribute value is not set to the custom token, the folder path and the file name are generated and stored with the portion of the attribute value being left empty. For example, the property setting screen 1400 in FIG. 18 is in the state where no attribute value is set to the custom token that takes "Estimate form" as the attribute name. In a case where the "Transit" button 1805 is pressed down in this state, the MFP cooperative server 120 requests the storage server 130 to store the data of the scanned image being displayed in the preview pane 1401 under the following conditions.

storage destination folder:"/tokita/Plastic Mold Inc./ 2020.02.27"

file name:"_20200227_Plastic Mold Inc._1"

<Scan Profile>

It is possible to set the folder allocation rule and the file naming rule, which are set as described above, for each of various scan workflows. Here, the scan workflow means a workflow for transmitting data of a scanned image obtained by scanning a document, such as a business form, to a specific transmission destination (for example, the storage server 130) under specific conditions. Information on the conditions on each scan workflow and the transmission destination is managed by a scan profile. It is possible for a user to easily implement a desired scan workflow by creating in advance a scan profile.

Figure 19:
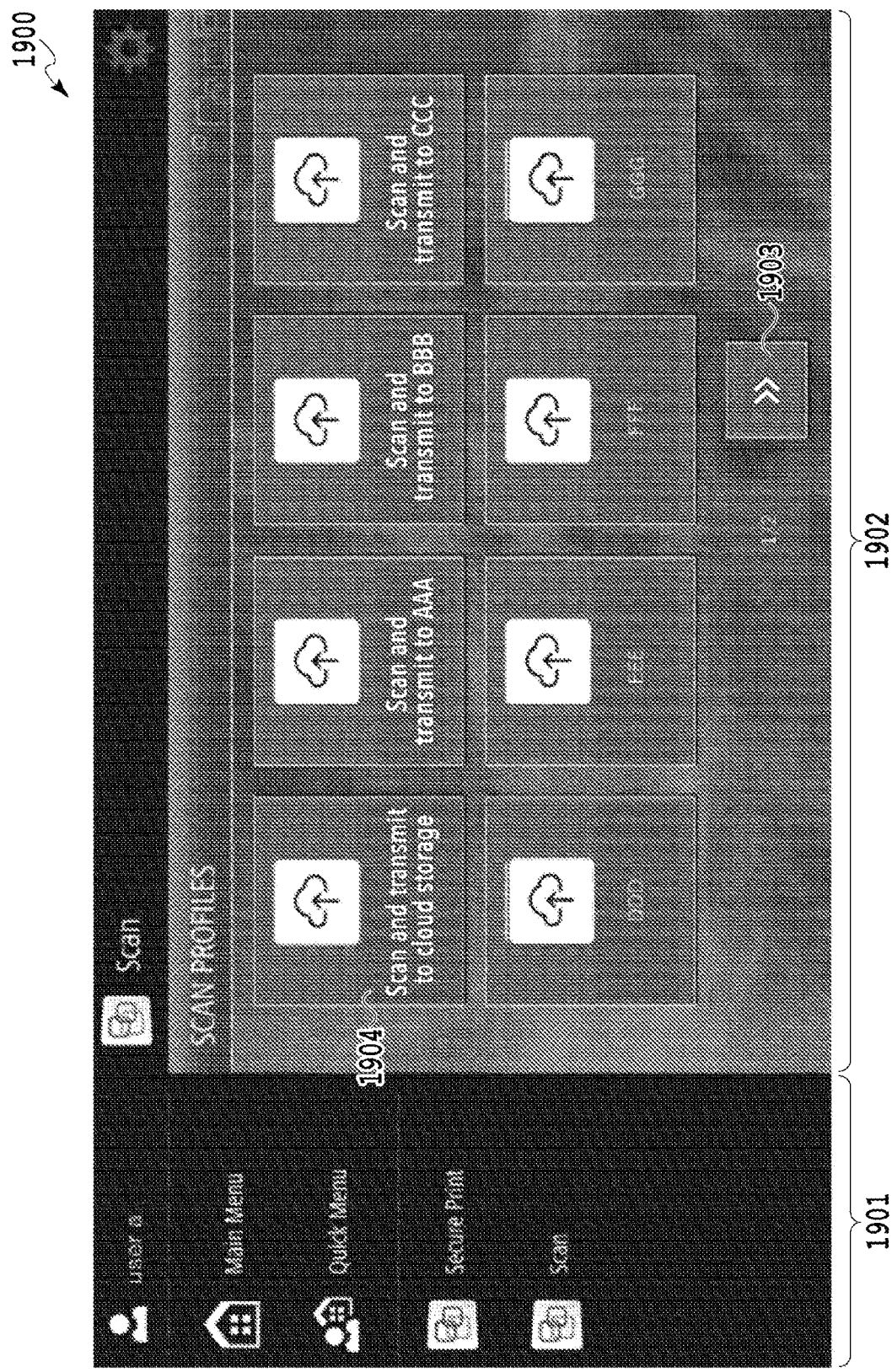
FIG. 19 is a diagram showing an example of a scan profile setting screen.

FIG. 19 shows an example of a UI screen (in the following, called "scan profile setting screen") for setting a scan profile, which is displayed on the operation unit 220 of the MFP 110 (or client PC 111). A scan profile setting screen 1900 shown in FIG. 19 includes a side menu area 1901 and a menu area 1902. Then, in a case where a user selects "Scan" from items displayed in the side menu area 1901, the screen transitions to a UI screen (in the following, called "scan profile editing screen") for performing editing work, such as addition and deletion of a scan profile, to be described later. In the menu area 1902, a plurality of icons corresponding to scan profiles is displayed. Each time a user creates a scan profile, an icon corresponding to the scan profile is added to the menu area 1902. Further, in a case where a button 1903 located at the bottom part in the menu area 1902 is pressed down, an icon of another scan profile that has not been displayed is displayed and it is made possible to browse the icon.

The scan profile setting screen 1900 shown in FIG. 19 is a UI screen that is displayed in a case where a user having a user ID of "user a" logs in to the MFP 110. It may also be possible to make scan profiles to be displayed different for different users who log in, or a scan profile available in a sharing manner to a plurality of users may exist.

It is assumed that a user selects an icon corresponding to an arbitrary scan profile on the scan profile setting screen 1900 and then gives instructions to perform a scan. Then, the property setting screen 1400 is displayed on which to determine a folder name and a file name in accordance with the folder allocation rule and the file naming rule corresponding to the selected scan profile. For example, it is assumed that the following folder allocation rule and the file naming rule are associated with the scan profile indicated by an icon 1904.

folder allocation rule:"/{Display name of login user}/{Company name}/{Year} {Month} {Day}/"file naming rule:"{Estimate form}_{Year} {Month} {Day}_{Company name}"

In this case, the scanned image that is generated after the icon 1904 is selected is displayed in the preview pane 1401 on the property setting screen 1400. Then, the folder allocation rule of the above-described contents associated with the scan profile corresponding to the selected icon 1904 is displayed in the folder path display area 1403. Further, the file naming rule of the above-described contents associated with the same scan profile is displayed in the file name display area 1404.

<<Creation of Scan Profile>>

Figure 20:
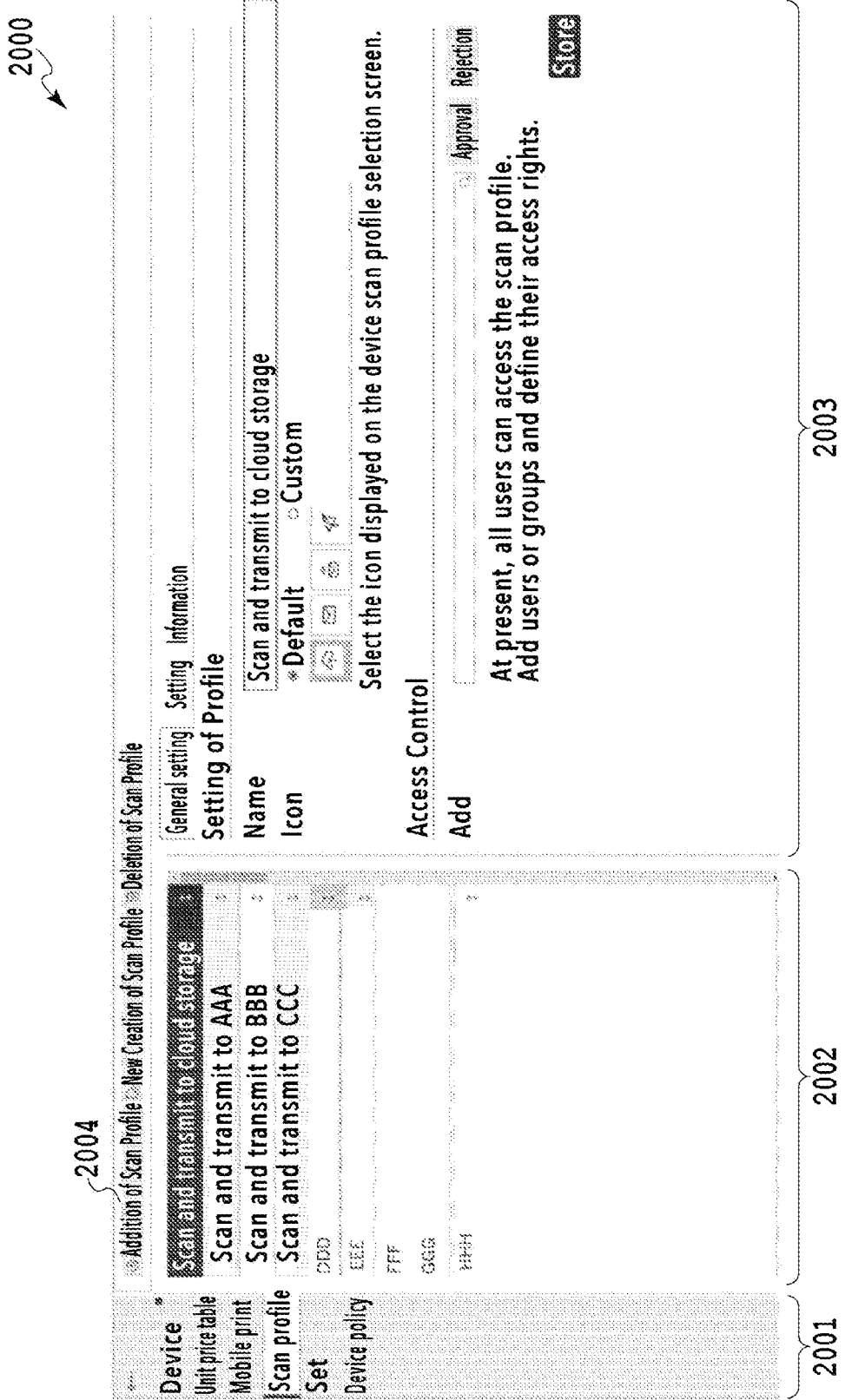
FIG. 20 is a diagram showing an example of a scan profile editing screen.

Next, a method of creating a scan profile is explained. It is made for a user to display a UI screen (in the following, described as "editing screen") for editing a scan profile as shown in FIG. 20 by logging in to the MFP cooperative server 120 via, for example, the client PC 111 and by the screen transition from a main screen (not shown schematically) that is displayed after the login. An editing screen 2000 shown in FIG. 20 includes a menu list are 2001, a profile list area 2002, and a profile setting area 2003. In the profile list area 2002, a scan profile currently being created or a list of created scan profiles is displayed. In the profile setting area 2003, the setting contents of the scan profile selected by a user form the list displayed in the profile list area 2002 are displayed. The profile list area 2002 and the profile setting area 2003 are displayed by selecting the item "Scan profile" within the menu list area 2001.

Figure 21:
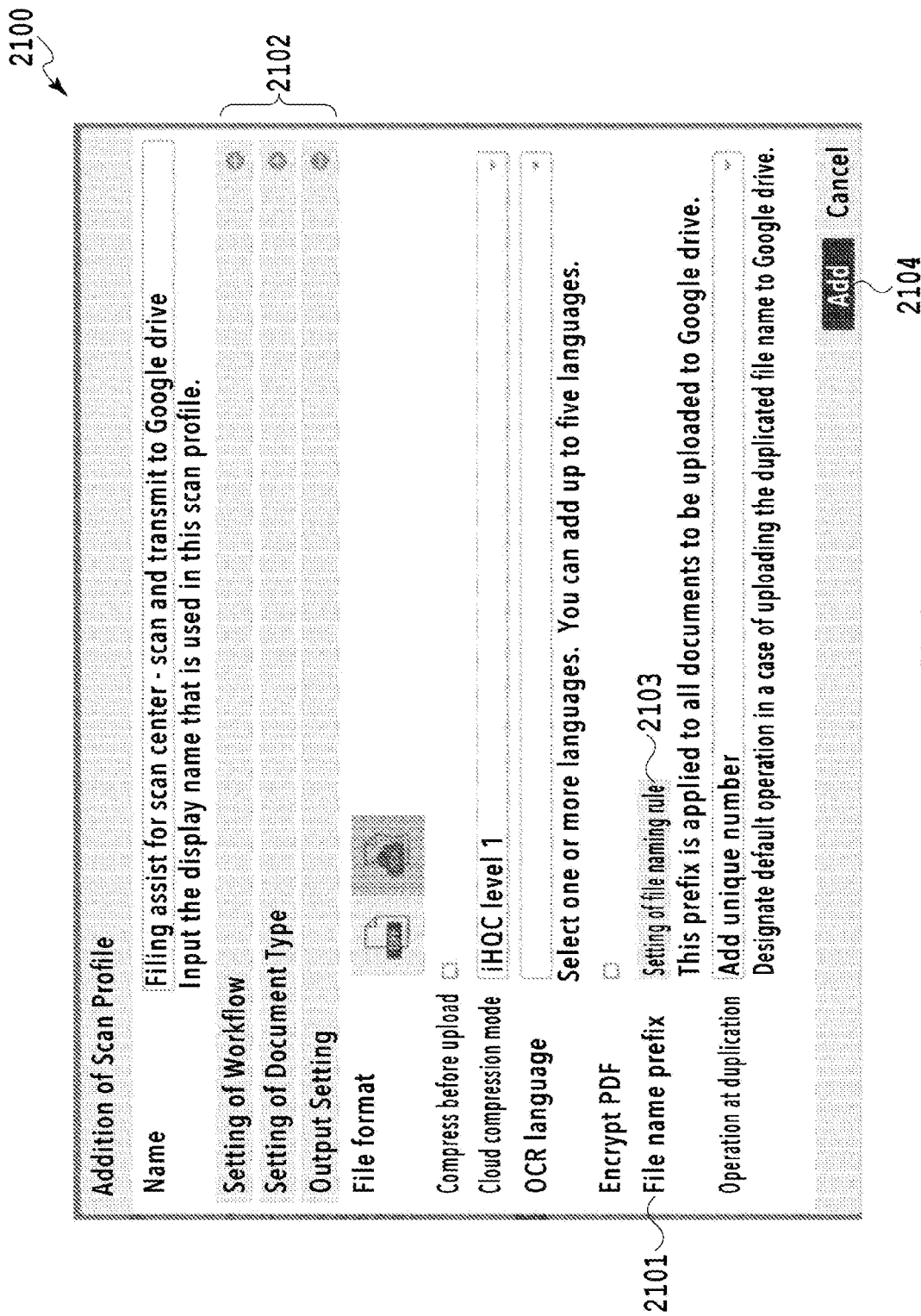
FIG. 21 is a diagram showing an example of a scan profile addition screen.

Further, in a case where a button 2004 located at the top part on the editing screen 2000 is pressed down, a UI screen (in the following, described as "addition screen") for adding a scan profile as shown in FIG. 21 is displayed on the editing screen 2000 in an overlapping manner and it is made possible to add a new scan profile. On an addition screen 2100 shown in FIG. 21, a plurality of setting tabs 2012 exists and in a case where one tab is selected therefrom, a plurality of setting items included in the tab is displayed. The example in FIG. 21 shows the state where the setting items in a case where the tab of "Output Setting" is selected. In "File name prefix" 2101 among the displayed setting items, a "Setting of file naming rule" button 2103 is displayed. By pressing down the "Setting of file naming rule" button 2103, the File Naming Rule setting screen 1300 described previously is displayed and it is made possible to create and edit the file naming rule.

FIG. 22 shows the state where the setting items in a case where the tab of "Setting of Workflow" within the addition screen 2100 in FIG. 21 is selected are displayed. The displayed setting items include a "Setting of rule of storage destination folder" button 2201 and by selecting the button 2201, the folder allocation rule setting screen 500 described previously is displayed. At this time, in a case where the folder allocation rule is already created, on the periphery of (in the example in FIG. 10 described previously, directly above) the "Setting of rule of storage destination folder" button 2201, the already-created folder allocation rule is displayed.

Figure 23:
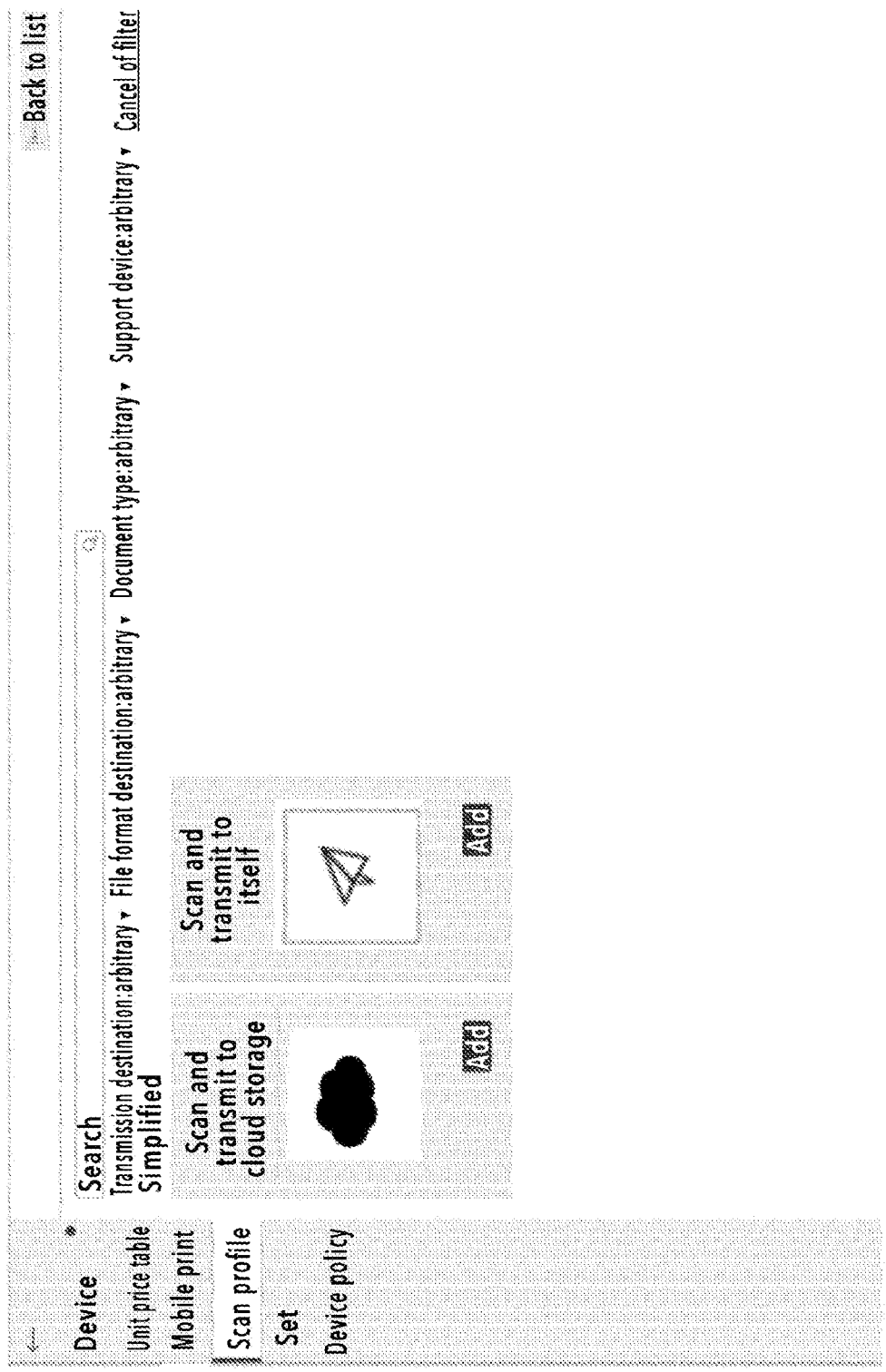
FIG. 23 is a diagram showing an example of a transmission destination setting screen.

Further, in a case where an "Add" button 2104 existing in the addition screen 2100 is pressed down after setting various kinds of information on the scan profile, the addition screen 2100 closes and this time, the screen switches to a UI screen (in the following, called "transmission destination setting screen") for setting the transmission destination of the data of the scanned image that has been filed. FIG. 23 shows an example of the transmission destination setting screen. On a transmission destination setting screen 2300 shown in FIG. 23, a plurality of transmission destinations is displayed in a list and in a case where one of them is selected, information on the transmission destination relating to the selection is stored in association with the scan profile currently being created.

In a case where the information of the requisite minimum for implementing a scan workflow is set as described above, the screen returns to the editing screen 2000 in FIG. 20. At that time, in the profile list area 2002, a newly created scan profile is added and displayed.

Modification Example

Next, an aspect is explained as a modification example in which it is made possible for a user to more easily set the character string verification rule and the character string extraction rule for the custom token to which a specific attribute name whose use frequency is high, such as "Company name" and "Date", is attached. Here, the specific custom token according to this modification example is called "attribute type custom token".

Figure 26:
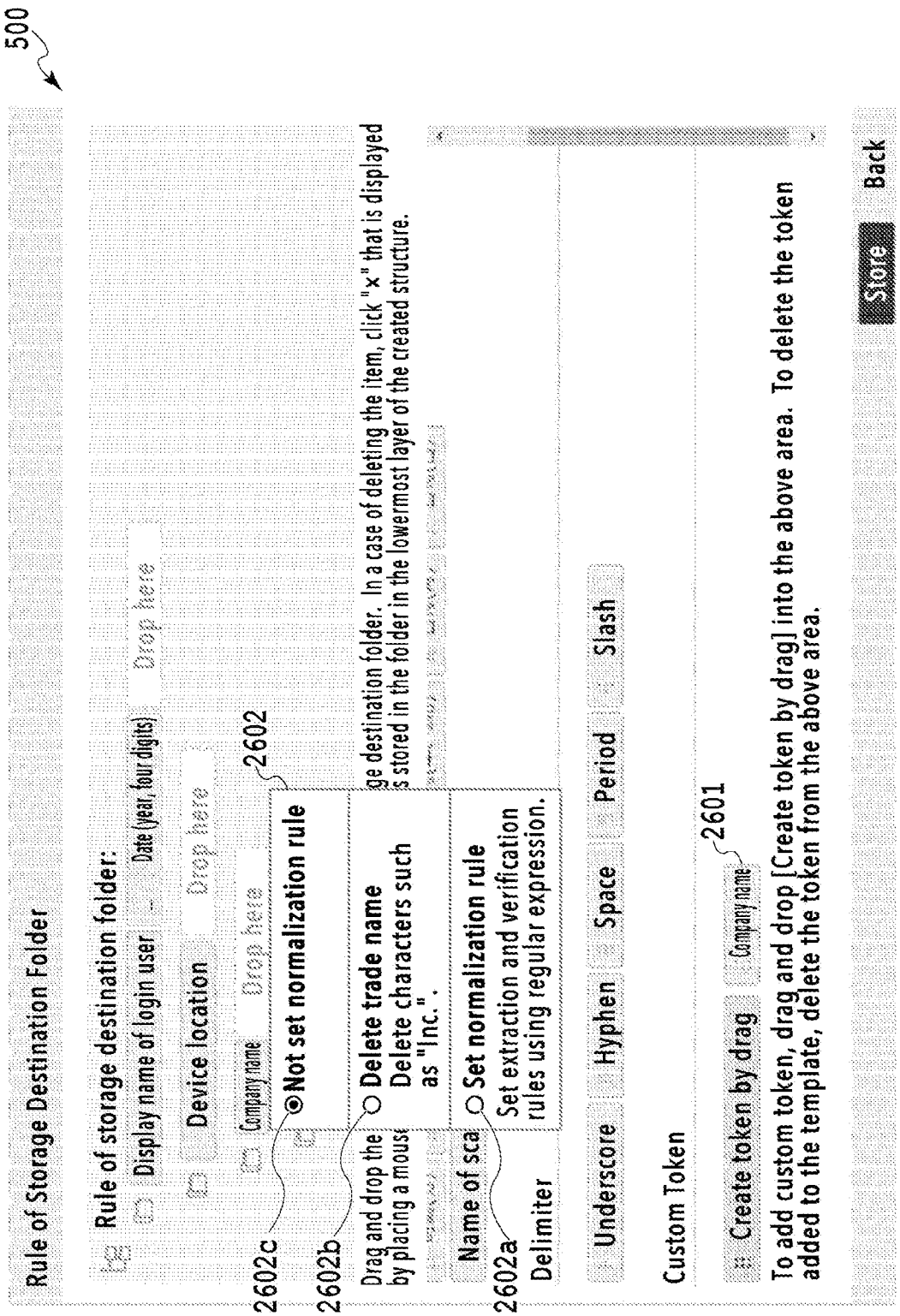
FIG. 26 is a diagram showing the way a custom token normalization rule is selected on the folder allocation rule setting screen.

FIG. 26 shows the state of the folder allocation rule setting screen 500 in a case where an attribute type custom token 2601 that takes "Company name" as the attribute name thereof is dropped into the token drop area. Here, under the dropped custom token, a context menu 2602 is displayed in a pulldown format. In this context menu 2602, radio buttons 2602*a* to 2602*c* exist. Each radio button corresponds to "Set normalization rule of data", "Delete trade name (Delete characters such as "Inc." included in trade name), and "Not set normalization rule of data". For example, a user who desires to set the data normalization rule selects the radio button 2602*a*. Then, the character string verification rule and/or the character string extraction rule associated in advance with the attribute type custom token is set. Due to this, it is possible for a user to easily set a desired custom token to which the character string verification rule and/or the character string extraction rule is attached. On the other hand, in a case where the radio button 2602*c* is selected, the normalization rule is not set to the dropped attribute type custom token. In a case where the radio button 2602*b* is selected, the setting to automatically delete characters, such as "Inc." included in the trade name, is performed for the dropped attribute type custom token.

It may also be possible to change the display aspect of the attribute type custom token depending on the scan profile selected by a user and the scan-target document type. For example, in a case where a scan profile for a business card scan is created, as the attribute type custom token that can be used for the folder allocation rule and the file naming rule, only "Company name", "Division", "Name", "Telephone number", and "Mail address" are displayed, and so on. Further, it may also be possible to provide a text field so that a user can freely customize a regular expression or the like in a case where a desired rule does not exist among alternatives within the context menu.

Figure 27:
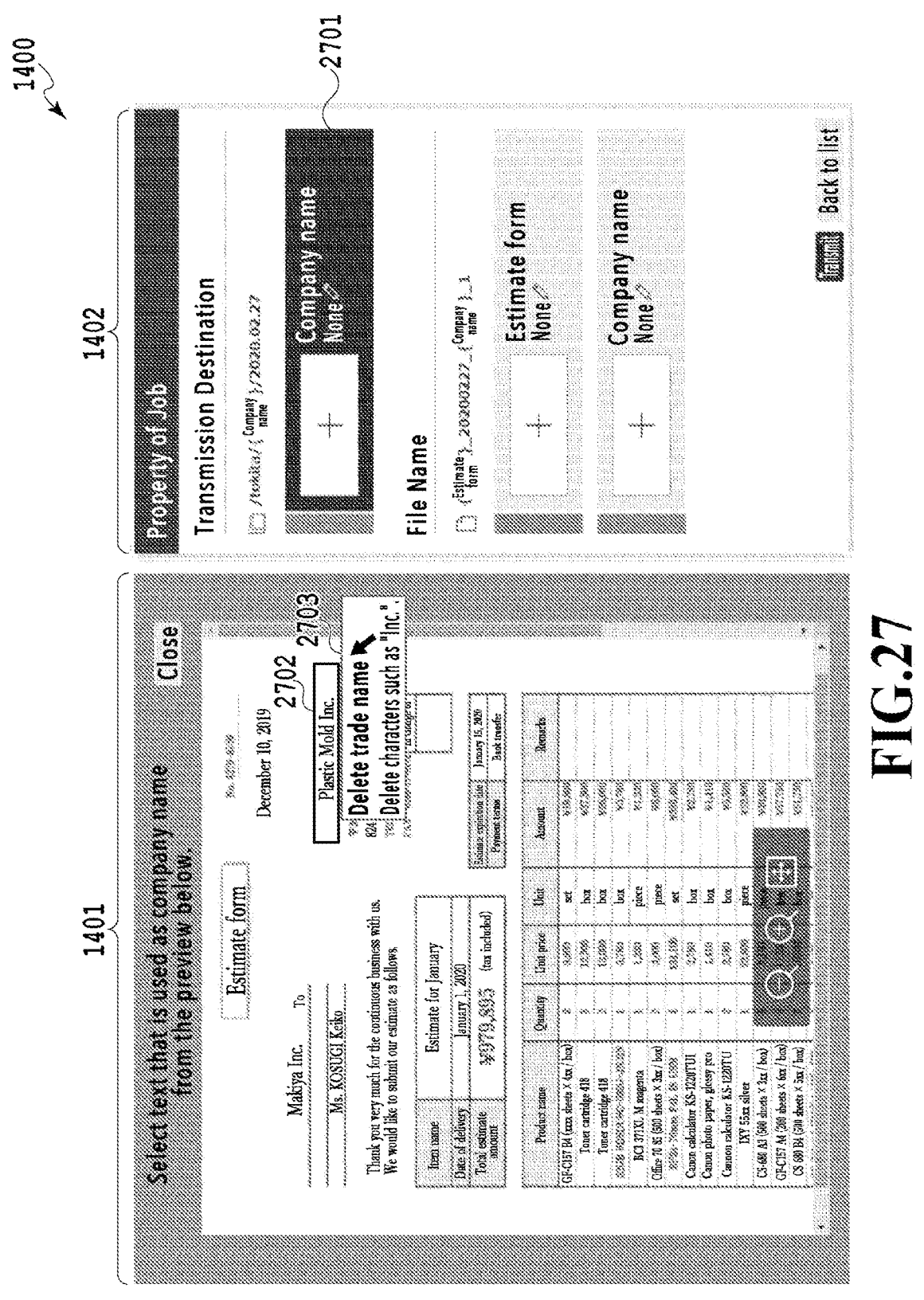

Furthermore, it may also be possible to enable a user to set the normalization rule to the custom token at timing of selecting a text block in the preview pane 1401 on the property setting screen 1400. FIG. 27 shows the property setting screen 1400 in a case where the attribute type custom token that takes "Company name" as the attribute name thereof is set to the folder allocation rule and the file naming rule. Here, the state is such that an attribute value input field 2701 is selected and highlighted. In a case where a user places a mouse over a text block 2702 in this state, a pop-up menu 2073 is displayed under the text block 2702. At this time, the contents displayed in the pop-up menu 2703 are the character string verification rule and/or the character string extraction rule associated in advance with the attribute type custom token of "Company name". In this example, it is possible for a user to set the normalization rule to delete the characters of "Inc." included in the trade name by selecting "Delete trade name" within the displayed pop-up menu. It may also be possible to enable a user to perform the setting of the normalization rule at the time of inputting an attribute value.

According to this modification example, time and effort at the time of setting the normalization rule to a custom token are saved, and therefore, it is made possible for a user to more easily make use of the character string verification rule and the character string extraction rule.

As above, according to the present embodiment, it is possible for a user to easily create and edit the folder allocation rule and the file naming rule necessary at the time of filing a document scanned image or the like and storing the file.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is made possible to more easily set the rule relating to folder allocation and file naming at the time of filing data, such as a document scanned image and a received facsimile, and storing the file.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-061446, filed Mar. 30, 2020 and No. 2020-172746, filed Oct. 13, 2020 which are hereby incorporated by reference wherein in their entirety.

What is claimed is:

1. An information processing apparatus for setting a rule, the apparatus comprising:
at least one memory that stores a program; and
at least one processor that executes the program to perform:
controlling a display of a user interface screen for setting the rule relating to property information that is used for storing a file to a folder,
wherein:
the user interface screen includes a first area for editing the rule and a second area displaying items a user can select,
the items include a general item corresponding to a predetermined attribute and a particular item corresponding to an arbitrary attribute name that a user can input,
the rule is set by performing a drag operation of at least one of the items from the second area and performing a drop operation of the dragged item into the first area by a user, and
the particular item having the input attribute name is arranged at a position designated with the dropped operation in the rule which is being displayed in the first area in a case where the particular item is dragged and dropped from the second area into the first area and the arbitrary attribute name of the dragged and dropped particular item is input by the user; and
setting a normalization rule for the particular item having the input attribute name, wherein the set normalization rule is used for normalizing a character string to be used for the property information.

2. The information processing apparatus according to claim 1, wherein the general item corresponds to an environment variable of the user or a delimiter.

3. The information processing apparatus according to claim 1, wherein the particular item having the input attribute name is further added to the second area, and
wherein, in a case where the particular item having the input attribute name is added to the second area on the user interface screen for setting a rule relating to first property information, the particular item having the input attribute name is further displayed in a second area of a user interface screen for setting a rule relating to second property information different from the first property information.

4. The information processing apparatus according to claim 1, wherein the position where the dragged item is to be dropped in the first area is a position prepared in advance for performing the drop operation.

5. The information processing apparatus according to claim 1, wherein the property information include a folder path of the folder, and
the rule is a rule to specify one or a plurality of character strings to be used for the folder path of the folder.

6. The information processing apparatus according to claim 1, wherein the property information includes a file name of the file to be stored, and
the rule is a rule to specify one or a plurality of character strings to be used for the file name of the file.

7. The information processing apparatus according to claim 1, wherein the file is scanned data acquired from an information processing apparatus having at least a scan function.

8. The information processing apparatus according to claim 7, wherein the scanned data is stored in the folder managed by an external server in accordance with the rule.

9. The information processing apparatus according to claim 1, wherein the set normalization rule is a rule for extracting and/or deleting a specific character from a character string to be used for the property information.

10. The information processing apparatus according to claim 1, wherein the processor executes the program to further perform:
notifying, in a case where the input arbitrary attribute name is not in conformity to a specified format when the arbitrary attribute name of the dragged and dropped particular item is input by the user, a user of that.

11. A non-transitory computer readable storage medium storing a program performing a control method for causing a computer to setting a rule, the control method comprising:
controlling a display of a user interface screen for setting the rule relating to property information that is used for storing a file to a folder,
wherein:
the user interface screen includes a first area for editing the rule and a second area displaying items a user can select,
the items include a general item corresponding to a predetermined attribute and a particular item corresponding to an arbitrary attribute name that a user can input,
the rule is set by performing a drag operation of at least one of the items from the second area and performing a drop operation of the dragged item into the first area by a user, and
the particular item having the input attribute name is arranged at a position designated with the dropped operation in the rule which is being displayed in the first area in a case where the particular item is dragged and dropped from the second area into the first area and the arbitrary attribute name of the dragged and dropped particular item is input by the user; and
setting a normalization rule for the particular item having the input attribute name, wherein the set normalization rule is used for normalizing a character string to be used for the property information.

12. A control method of an information processing apparatus for setting a rule, the control method comprising:
controlling a display of a user interface screen for setting the rule relating to property information that is used for storing a file to a folder,
wherein:
the user interface screen includes a first area for editing the rule and a second area displaying items a user can select,
the items include a general item corresponding to a predetermined attribute and a particular item corresponding to an arbitrary attribute name that a user can input,
the rule is set by performing a drag operation of at least one of the items from the second area and performing a drop operation of the dragged item into the first area by a user, and
the particular item having the input attribute name is arranged at a position designated with the dropped operation in the rule which is being displayed in the first area in a case where the particular item is dragged and dropped from the second area into the first area and the arbitrary attribute name of the dragged and dropped particular item is input by the user; and
setting a normalization rule for the particular item having the input attribute name, wherein the set normalization rule is used for normalizing a character string to be used for the property information.

13. An information processing apparatus comprising:
at least one memory that stores a program; and
at least one processor that executes the program to:
display, on a display, a user interface screen for performing setting for generating a name related to a document,
wherein the user interface screen includes an area that arranges items selected by a user from a plurality of items that includes a first item for using a variable of a predetermined attribute to generate the name and a second item for using, to generate the name, a character string that is obtained by using a character string extraction rule and an Optical Character Recognition (OCR) processing on the document, and
wherein the user interface screen enables a user to perform a drag and drop operation on at least one of the arranged items to change the arrangement of the selected items in the area; and
perform the setting according to the changed arrangement of the selected items.

14. The information processing apparatus according to claim 13, wherein the name is a file name of a file corresponding to the document.

15. The information processing apparatus according to claim 13, wherein the name is a folder name of a folder to which a file corresponding to the document is to be stored.

16. The information processing apparatus according to claim 13, wherein the name is a folder path including a folder name of a folder to which a file corresponding to the document is to be stored.

17. The information processing apparatus according to claim 13, wherein the at least one processor executes the program to further:
perform the OCR processing on the document to obtain an OCR result; and
using the setting and the obtained OCR result, generate the name related to the document.

18. The information processing apparatus according to claim 17, wherein, in a case where the selected items include the second item, the generated name includes the character string obtained by applying the character string extraction rule to the obtained OCR result, the character string extraction rule being set to the second item.

19. The information processing apparatus according to claim 13, wherein the variable of the predetermined attribute used by the first item corresponds to an environment variable of the user.

20. The information processing apparatus according to claim 13, wherein the variable of the predetermined attribute used by the first item corresponds to a name of login user.

21. The information processing apparatus according to claim 13, wherein the variable of the predetermined attribute used by the first item corresponds to a date.

22. The information processing apparatus according to claim 13, wherein the variable of the predetermined attribute used by the first item corresponds to a time.

23. The information processing apparatus according to claim 13, wherein a delimiter is able to be arranged between the items arranged in the area by the user.

24. The information processing apparatus according to claim 13, wherein, the setting for generating the name can be performed to insert a delimiter between a date and a time.

25. The information processing apparatus according to claim 13, wherein the plurality of items further includes a third item corresponding a delimiter, and
wherein the third item is able to be arranged between the items arranged in the area by the user.

26. The information processing apparatus according to claim 13, wherein the character string extraction rule is a rule for extracting the character string from an OCR result of the OCR processing.

27. The information processing apparatus according to claim 13, wherein the character string extraction rule is a rule for obtaining the character string by deleting a part of an OCR result of the OCR processing.

28. A non-transitory computer readable storage medium storing a program that causes a computer to:
 display, on a display, a user interface screen for performing setting for generating a name related to a document,
 wherein the user interface screen includes an area that arranges items selected by a user from a plurality of items that includes a first item for using a variable of a predetermined attribute to generate the name and a second item for using, to generate the name, a character string that is obtained by using a character string extraction rule and an Optical Character Recognition (OCR) processing on the document, and
 wherein the user interface screen enables a user to perform a drag and drop operation on at least one of the arranged items to change the arrangement of the selected items in the area; and
 perform the setting according to the changed arrangement of the selected items.

29. A control method of an information processing apparatus, the control method comprising:
 displaying, on a display, a user interface screen for performing setting for generating a name related to a document,
 wherein the user interface screen includes an area that arranges items selected by a user from a plurality of items that includes a first item for using a variable of a predetermined attribute to generate the name and a second item for using, to generate the name, a character string that is obtained by using a character string extraction rule and an Optical Character Recognition (OCR) processing on the document, and
 wherein the user interface screen enables a user to perform a drag and drop operation on at least one of the arranged items to change the arrangement of the selected items in the area; and
 performing the setting according to the changed arrangement of the selected items.

* * * * *